(12) United States Patent
Martin et al.

(10) Patent No.: US 10,896,281 B2
(45) Date of Patent: Jan. 19, 2021

(54) METHOD, AND STORAGE MEDIUM AND ALSO DEVICE FOR CARRYING OUT SAME

(71) Applicant: Infineon Technologies AG, Neubiberg (DE)

(72) Inventors: Andreas Martin, Munich (DE); Daniel Beckmeier, Unterhaching (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

(21) Appl. No.: 16/683,725

(22) Filed: Nov. 14, 2019

(65) Prior Publication Data

US 2020/0159883 A1 May 21, 2020

(30) Foreign Application Priority Data

Nov. 16, 2018 (DE) .................. 10 2018 128 881

(51) Int. Cl.
*G06F 30/392* (2020.01)
*G06F 111/20* (2020.01)
*G06F 119/06* (2020.01)

(52) U.S. Cl.
CPC ........ *G06F 30/392* (2020.01); *G06F 2111/20* (2020.01); *G06F 2119/06* (2020.01)

(58) Field of Classification Search
CPC ..................................... G06F 30/392
USPC ........................................ 716/120
See application file for complete search history.

(56) References Cited

U.S. PATENT DOCUMENTS 6,741,445 B1 * 5/2004 Phan ................ H01L 21/67253
361/230
2017/0330807 A1 11/2017 Hook

FOREIGN PATENT DOCUMENTS

DE 102017123508 A1 11/2017

OTHER PUBLICATIONS

Chu, Y.-L., etal., "A CDM-like Damage Mechanism for Multiple Power Domains Fabricated with Deep N-well Processes", IEEE International Reliability Physics Symposium, Apr. 2-6, 2017, 4 pages.
Martin, Andreas "Circuit relevant well charging from metal antenna and its degradation on digital MOS transistor reliability", Infineon Technologies AG, 2013 IIRW Final Report, IEEE International Integrated Reliability Workship Final Report, Oct. 13-17, 2013, 4 pages.

(Continued)

*Primary Examiner* — Suchin Parihar
(74) *Attorney, Agent, or Firm* — Slater Matsil, LLP

(57) ABSTRACT

A method for the computer-aided characterization of a circuit comprising a semiconductor layer and a semiconductor component region embedded in the semiconductor layer in an electrically insulated manner, wherein the semiconductor component region is optionally coupled to a dielectric layer structure to be protected, the method comprising determining an indication representing vis-à-vis the semiconductor layer an intensity of an electrical charging of the semiconductor component region by a production process used to produce the circuit, wherein a physical construction of the semiconductor component region is taken into account when determining the indication, and classifying the semiconductor component region taking account of the indication.

28 Claims, 16 Drawing Sheets

(56) References Cited

OTHER PUBLICATIONS

Martin, Andreas et al., "Reliability Degradation of MOS Transistors Originated from Plasma Process-Inducted Charging of Circuit Blocks and Detected with fWLR Methods", Infineon Technologies AG, 2011 IIRW Final Report, IEEE International Integrated Reliability Workshop Final Report, Oct. 16-20, 2011, 5 pages.
Wikipedia, "Antenna Effect", https://en.wikipedia.org/wiki/Antenna_effect, printed Jun. 18, 202, 3 pages.

* cited by examiner

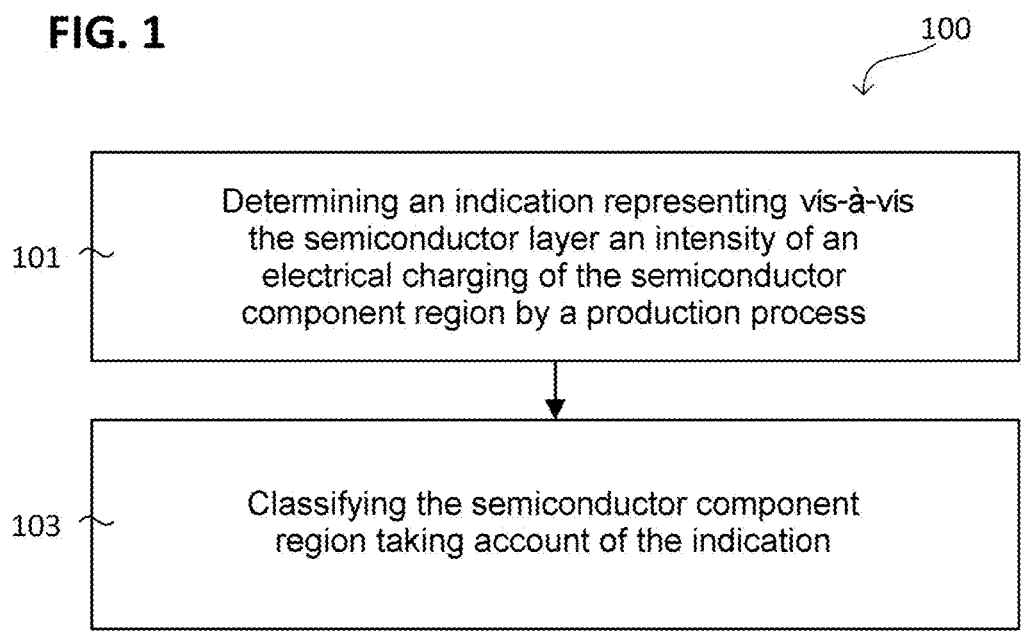

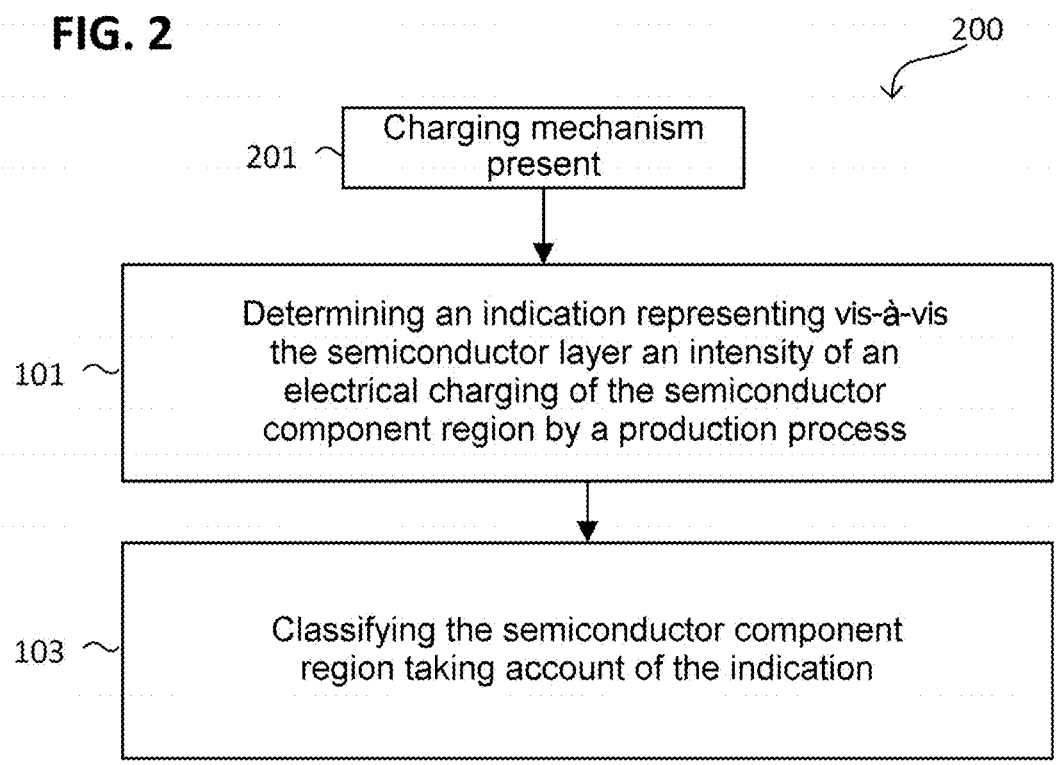

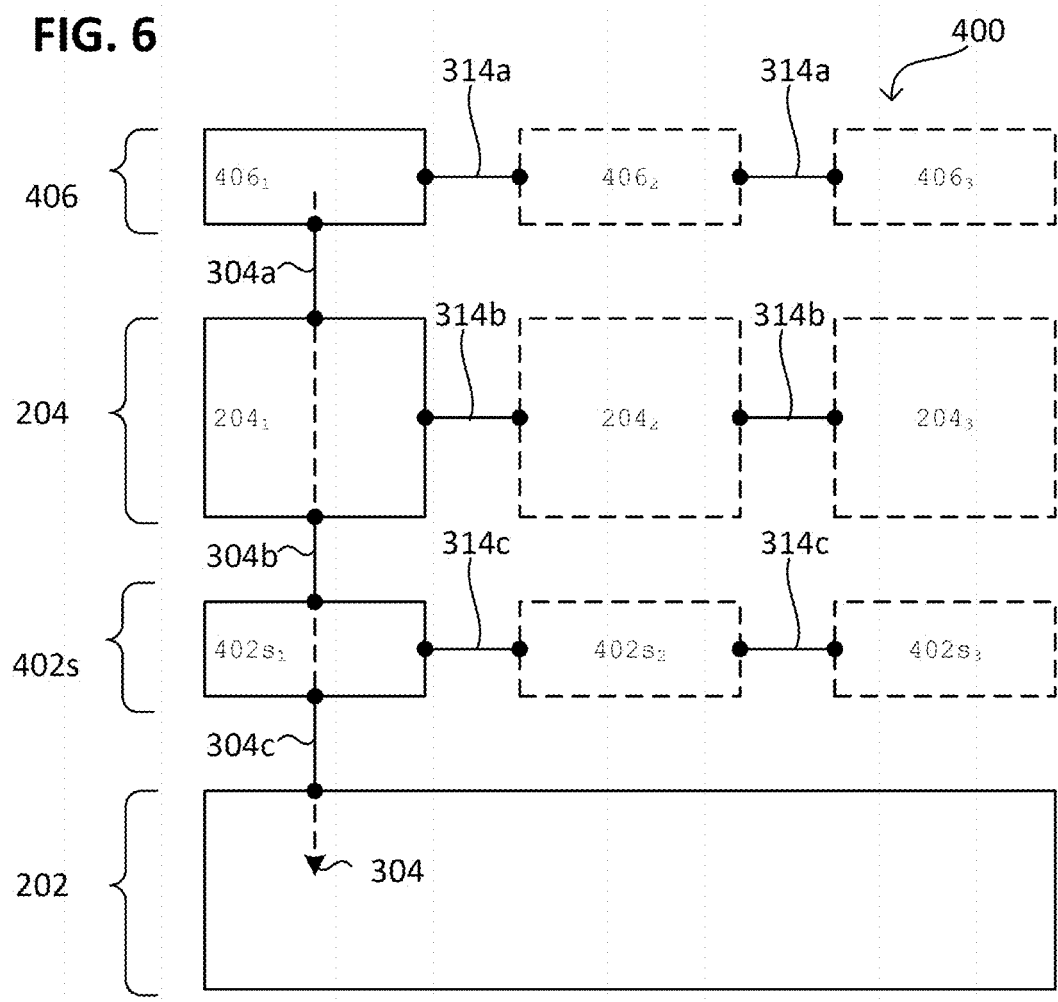

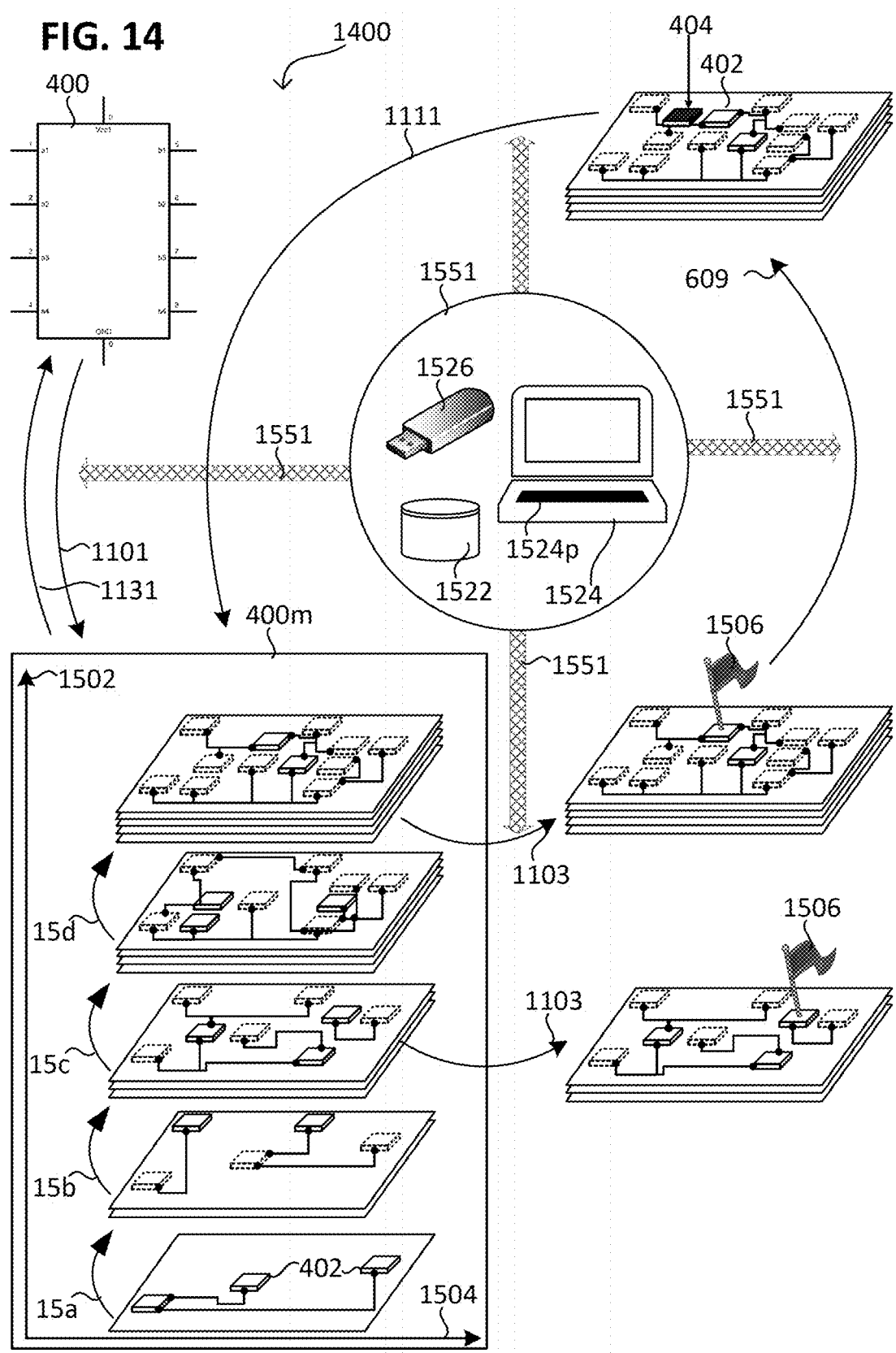

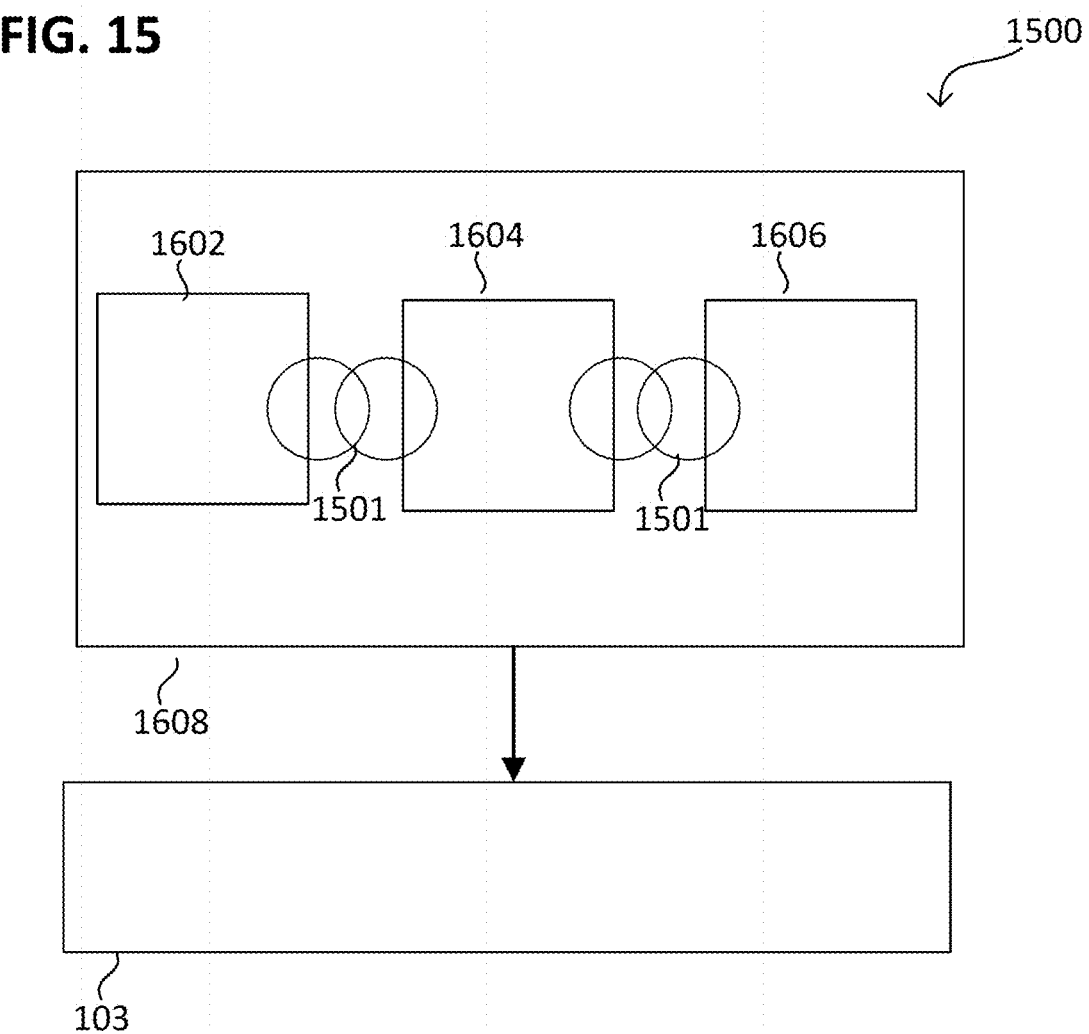

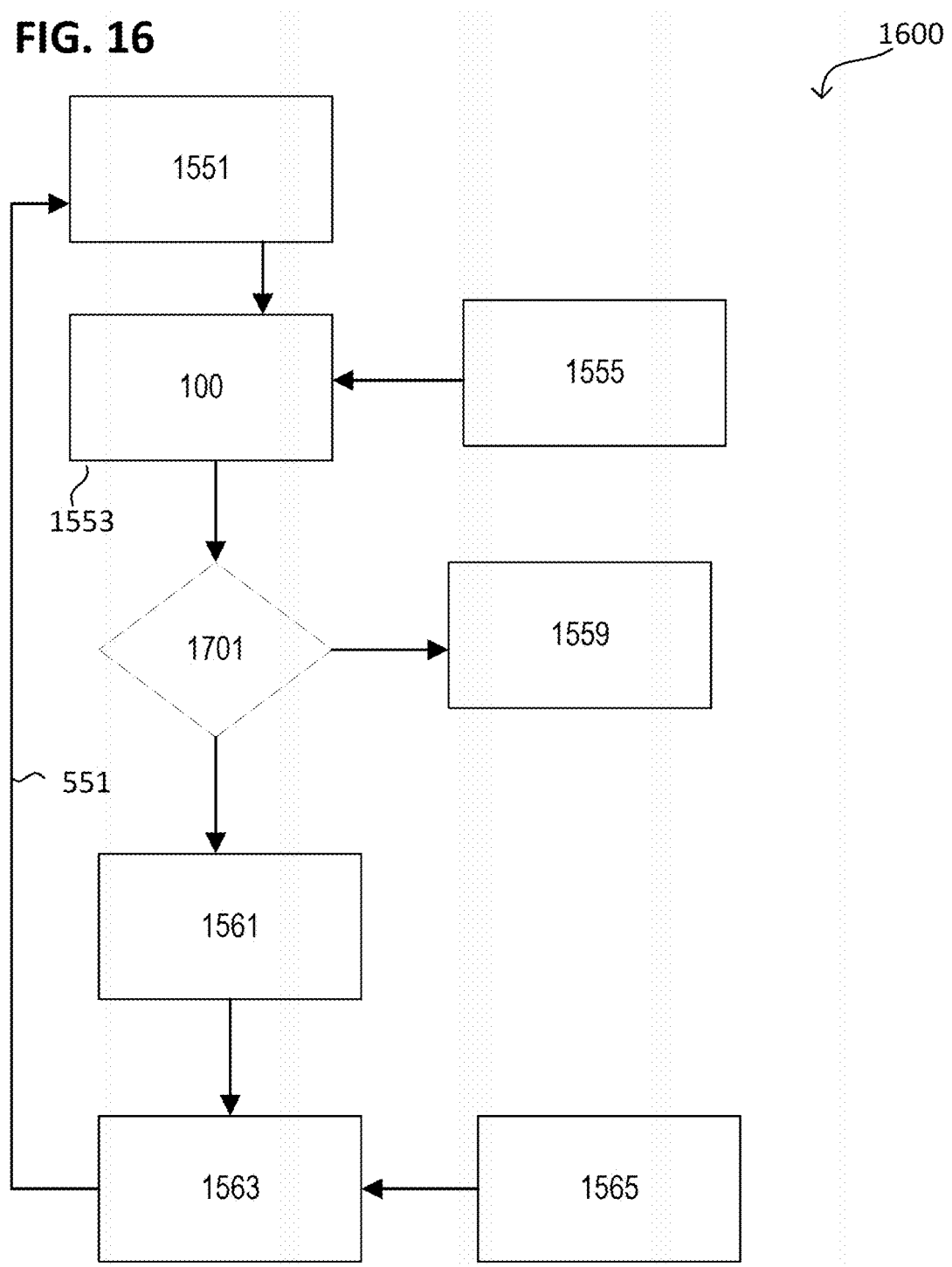

METHOD, AND STORAGE MEDIUM AND ALSO DEVICE FOR CARRYING OUT SAME

This application claims the benefit of German Patent Application No. 102018128881.6, filed on Nov. 16, 2018, which application is hereby incorporated herein by reference.

TECHNICAL FIELD

Various exemplary embodiments relate to a method and a storage medium and also a device for carrying out same.

BACKGROUND

In general a semiconductor chip (also referred to as integrated circuit, IC, chip or microchip) can be processed using semiconductor technology on and/or in a wafer (or a substrate or a carrier). In order to produce a semiconductor chip, a semiconductor wafer can be processed; by way of example, one or more layers can be deposited and subsequently processed, e.g., patterned, masked and/or removed. Various production processes which affect the semiconductor chip are employed in this case.

Many production processes for semiconductor chips use plasma or other charge-based effects which bring about an electrical (e.g., electrostatic) charging of metal lines of the semiconductor chip. Under certain circumstances, the charging can bring about a tunneling current through a dielectric layer, e.g., a gate dielectric, which results in the layer (e.g., the dielectric) being damaged or destroyed.

The damage can arise in the form of neutral oxide effects which form trap states in the oxide. These states can be charged again as a result of the operation of the semiconductor chip during the lifespan of the semiconductor chip. With too many trap states which are charged, the transistor operating parameters can shift to an extent such that the semiconductor chip fails during its lifespan. It is conventional practice to use so-called design rules for the production of semiconductor products in order to avoid a potential critical configuration resulting in charging. In order to avoid the damage, the design rules are ensured by means of design rule checks (DRCs) and are taken into account by routers. Illustratively, the DRC analyzes the construction of the circuit, and identifies those components which are subject to a critical electrostatic charging during the production of the circuit. Consequently, by means of the DRC it is possible to determine whether a circuit is exposed to an increased risk of damage during its production.

Semiconductor circuits usually contain structures which can protect a gate dielectric against electrostatic charging, e.g., diodes (also referred to as protective diode). Such a protective diode provides for example a discharge path between the gate and the well of the transistor. On account of the leakage current, they limit the potential drop across the gate dielectric, which in turn reduces the current density through the gate dielectric and thus the damage to the gate dielectric.

A similar situation can arise if the gate is not charged directly, but rather by way of detours via some other insulated region which has become charged, e.g., via some other well. A commercial DRC often combats such a case by ensuring "blind" that each insulated region and/or well can be discharged via a protective element, e.g., a protective diode.

SUMMARY

Various exemplary embodiments are based on the insight, for example, that the conventional DRC fails to take account of various properties of the circuit, as a result of which for example too many protective diodes are required and/or various configurations which are jeopardized are only inadequately identified or not identified at all or are not protected sufficiently. Illustratively, in various exemplary embodiments, the intensity of the potential electrical charging is taken into account in order to decide whether the circuit is adapted.

By way of example, various exemplary embodiments take account of when the protective diode is incompatible with the configuration of the circuit (e.g., in the case of a floating well). By way of example, various exemplary embodiments take account of the form, which terminals are connected to metal lines (so-called "antennas") and/or the size of the well. By way of example, in particular very small (a few $\mu m^2$) or very large ($mm^2$ range) wells and/or very many connected metal lines result in a greater risk of the circuit being damaged by an electrical charging. By way of example, various exemplary embodiments take account of whether or which regions of the well are sufficiently protected. By way of example, various exemplary embodiments take account of a configuration of the circuit in which the transistor to be protected and thus a gate dielectric (for example a gate oxide) are arranged outside the well. By way of example, various exemplary embodiments take account of the type of the gate dielectric (for example the gate oxide) and/or the thickness of the gate dielectric (for example the gate oxide).

BRIEF DESCRIPTION OF THE DRAWINGS

Exemplary embodiments of the invention are illustrated in the figures and are explained in greater detail below.

FIGS. 1, 2, 9 to 11 each show a method in accordance with various embodiments in a schematic flow diagram;

FIGS. 6, 7 and 8 each show a circuit in a schematic circuit diagram;

FIGS. 14, 15 and 16 each show a method in accordance with various embodiments in a schematic flow diagram.

DETAILED DESCRIPTION OF ILLUSTRATIVE EMBODIMENTS

Figure 3A:
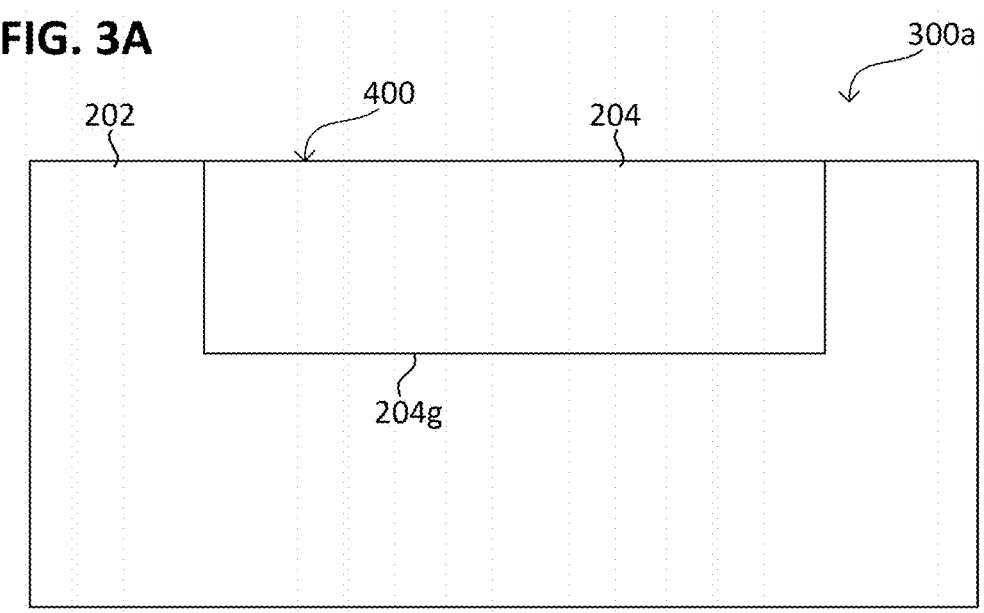
FIGS. 3A, 3B, 4A, 4B, 5A, 5B and 13 each show a circuit in a schematic cross-sectional view.

In the following detailed description, reference is made to the accompanying drawings, which form part of this description and show for illustration purposes specific exemplary embodiments in which the invention can be implemented. In this regard, direction terminology such as, for instance, "at the top", "at the bottom", "at the front", "at the back", "front", "rear", etc. is used with respect to the orientation of the figure(s) described. Since component parts of exemplary embodiments can be positioned in a number of different orientations, the direction terminology serves for illustration and is not restrictive in any way whatsoever. It goes without saying that other exemplary embodiments can be used and structural or logical changes can be made, without departing from the scope of protection of the present invention. It goes without saying that the features of the various illustrative exemplary embodiments described herein can be combined with one another, unless specifically indicated otherwise. Therefore, the following detailed description should not be interpreted in a restrictive sense, and the scope of protection of the present invention is defined by the appended claims.

In the figures, identical or similar elements are provided with identical reference signs, insofar as this is expedient.

The methods described below and/or the model of the circuit can be represented for example by means of code segments which can be stored on a storage medium and/or be executed by means of a processor. The model of the circuit (also referred to as circuit model) can represent the physical construction thereof, the interconnection thereof and/or the production thereof.

In accordance with various exemplary embodiments, at least one (i.e., exactly one or more than one) semiconductor component region, e.g., a plurality of semiconductor component regions, of the circuit is/are classified. Classifying (also referred to as classing) can be understood to mean that the at least one semiconductor component region is assigned in accordance with its properties to one class (also referred to as group) from a plurality of classes. This process is also referred to as class allocation. Illustratively, a classification is a combination of identical or similar semiconductor component regions in one group or class.

Classes can be understood for example as disjoint, i.e., non-overlapping, mutually adjacent intervals of property values which are bounded by a lower and an upper class limit and are uniquely defined. All values of a class lie within the upper and lower class limits, the difference between the upper and lower class limits being the class width.

The classifying can be preceded by dividing the entire property values that occur into intervals (i.e., forming the classes). Forming the classes can be directed for example to at least one predefined criterion, such as, for instance, a predefined production criterion, quality criterion and/or safety criterion.

In accordance with various exemplary embodiments, the term "coupled" or "coupling" and "connected" or "connection" and also "linked" or "interconnected" can be understood in the sense of an, e.g., direct or indirect, electrical connection and/or electrical interaction, including a physical connection and/or interaction. The interaction can be mediated for example by means of an electric current which flows along the current path provided by means of the coupling. An electrical connection can comprise an electrical conductive connection, i.e., having a resistive behavior, e.g., provided by means of a metal or a degenerate semiconductor material (such as, for example, polysilicon), e.g., in the absence of a pn junction in the electric current path. An indirect electrical connection can comprise at least one additional circuit element in the electric current path which does not change the operation of the circuit or leaves it substantially unchanged.

An antenna DRC (design rule check or referred to as DRC herein for simplification) is used during the production of semiconductor products in order to identify in the products antenna areas causing critical chargings, which can comprise an arrangement of conductive metal segments which can be joined together resistively.

In accordance with various exemplary embodiments, it has been recognized that the electrical resistance between a semiconductor component region and the semiconductor substrate can be influenced by a multiplicity of properties. The electrical resistance can be brought about for example by a strong lateral isolation, such as, for instance, a deep trench or a silicon-on-insulator substrate (SOI). Likewise, the combination of vertical and lateral isolation which can comprise for example one or more than one pn junction (also referred to as semiconduction junction), such as, for example, a triple well (also referred to as deep n-type well) of epitaxial layers, can cause an extremely high resistance, even at the usually elevated wafer temperature during the process which causes the electrostatic charging. Standard wells and a large distance in the substrate with respect to the component to be protected can likewise inhibit charge balancing.

In accordance with various exemplary embodiments, provision is made of a method and a storage medium and also a device for carrying out the same which illustratively takes account of the actual intensity of the charging of the circuit and the circuit structures thereof. On the one hand, this prevents semiconductor component regions from being classified incorrectly as safe or from being classified incorrectly as jeopardized. On the other hand, this enables the design rules to be relaxed since safety tolerances can be reduced.

In accordance with various exemplary embodiments, provision is made of a method and a storage medium and also a device for carrying out the same which carry out a DRC which illustratively marks as jeopardized only those semiconductor component regions of a circuit which are subjected to a critical electrical charging. Further functionalities are optionally provided, which can increase the precision of the DRC in order to reduce the outlay required for correcting the circuit design and the circuit area required for protective circuit structures (in other words for circuit structures that afford protection).

In accordance with various exemplary embodiments, the intensity of the charging of a semiconductor component region can be measured by means of a factor (or some other indication) by means of which the antenna area is normalized for example in the design rule. For this purpose, by way of example, various wells with the metal lines thereof and/or the configurations thereof can be identified and/or taken into account by means of the DRC.

The areas or surface areas taken into account herein can for example be understood as parallel to a principal plane of the circuit and/or denote the area through which an electric field is formed and/or an electric current (e.g., resulting therefrom) (e.g., a tunneling or creepage current) flows, e.g., with a direction (e.g., field direction and/or current direction) transversely with respect to the area. A surface area can denote the size (e.g., the area content) of a surface and/or interface (e.g., in square millimeters).

In accordance with various exemplary embodiments, a semiconductor layer can be processed in order to form one or more semiconductor chips in the semiconductor layer. A semiconductor chip can comprise an active chip region, in which for example the finished interconnected circuit is intended to be formed. The active chip region can be arranged in a part of the semiconductor layer and can comprise at least one circuit element (one circuit element or a plurality of circuit elements), such as a transistor, a resistor, a capacitor, a diode, the interconnection thereof or the like. The at least one circuit element and/or the finished interconnected circuit can be configured for carrying out operations, e.g., computation operations, storage operations or some other logic switching function. Alternatively or additionally, the at least one circuit element and/or the finished interconnected circuit can be configured for carrying out switching operations or amplification operations, e.g., in power electronics (e.g., using power circuit elements).

Various exemplary embodiments involve determining whether and/or which semiconductor component region of the circuit is electrically charged by a production process by means of which the circuit is produced, and/or whether the electrical charging can damage a dielectric layer structure to be protected (e.g., whether an electrostatically jeopardized dielectric layer structure is involved). The electrostatic charging can be brought about for example by means of a charge transfer and/or charge separation (also referred to as electrostatic influence or electrostatic induction) and/or by means of electrical charges being introduced into the circuit (e.g., from outside). The production process can comprise for example: an etching process, a patterning process, a plasma-enhanced chemical vapor deposition, a deposition of intermetallic dielectrics, chemical mechanical polishing (CMP, also referred to as chemical mechanical planarization) and/or purging with a purging fluid. By way of example, the production process can use a plasma. The plasma can be provided for example by means of a corona discharge which brings about an ionization of a plasma-forming gas (also referred to as working gas).

In accordance with various exemplary embodiments, the circuit can comprise or be part of a semiconductor circuit. Alternatively or additionally, the component to be protected can comprise or be part of a semiconductor component.

In accordance with various exemplary embodiments, an electrically conductive material can comprise a metal, a metal alloy, an intermetallic compound, a silicide (e.g., titanium silicide, molybdenum silicide, tantalum silicide or tungsten silicide) a conductive polymer, a polycrystalline semiconductor, or a degenerate semiconductor, e.g., polycrystalline silicon (also called polysilicon) or degenerate silicon. Electrically conductive material can be understood as providing a moderate electrical conductivity, e.g., with an electrical conductivity (measured at room temperature and with a constant direction of an electric field) of greater than approximately 10 S/m, e.g., greater than approximately $10^2$ S/m, or providing a high electrical conductivity, e.g., greater than approximately $10^4$ S/m, e.g., greater than approximately $10^6$ S/m.

In accordance with various exemplary embodiments, a method is provided which contains rules for identifying a degradation of a semiconductor well, e.g., on account of an indirect or direct well charging. The method can provide and/or take account of at least one of the following:

a complete check to calculate risk minimization;

wells with antennas can be checked (e.g., irrespective of whether or not a MOS semiconductor component is embedded in the well), which are connected for example to the gate of a MOS semiconductor component to be protected;

a p/n junction, a so-called protective diode or an ohmic contact (e.g., $n^+/n$) is not required in all well configurations.

The protective diode can be dimensioned in accordance with the risk (and/or intensity of the charging).

The size of the well (e.g., in the case of direct well charging) is taken into account and/or defines the risk in accordance with the size of the well and the cumulated area of the metal segments of the antennas.

Well segments connected to one another can be jointly identified and/or taken into account as a large well.

Correct provision of a discharge path in the case of a large well configuration (by way of example, the diode surface area and also the local positioning of the diodes can be adapted in accordance with the well surface area and/or the antenna size).

The type of MOS dielectric and/or the cumulated gate surface area (and the direct protective diodes thereof in the well thereof) connected to a well can be determined and taken into account for dielectric degradation.

By way of example, it is possible to take account of other connections between the well and various semiconductor components outside the well which counteract the charging, e.g., contribute to a discharge (e.g., by means of capacitance, diffusion region, resistive current path). By way of example, it is possible to take account of the leakage current characteristic of the charged well configuration. By way of example, it is possible to use a circuit simulation for determining the effectiveness of a discharge path.

In accordance with various exemplary embodiments, a plurality of extended inspection dimensions can be configured (e.g., implemented) in an antenna DRC in such a way as to eliminate or at least significantly reduce the risk of charging damage as a result of a charged well and/or a charge-insulated semiconductor component region. Applying the extended inspection dimensions in the method can be carried out step by step in order to determine a possible risk through to a precise indication of jeopardized transistors, including a circuit simulation. By way of example, a protective diode is required only in severely jeopardized cases and not in all cases generally.

In accordance with various exemplary embodiments, an encoded well-antenna DRC (WA-DRCs) can be provided (e.g., implemented). The latter can be applied for example in automatic router software, a yield-optimized product design system (referred to as "Design for Productivity") and/or a computer-aided automated layout optimization system for mask production (referred to as "Layout Polishing"), for example in order to identify a critical indirect or direct well charging in a circuit. A layouter (or an automated system) can then adapt the circuit (or the configuration thereof) before corresponding production process masks are produced and the latter are used to process the wafer for forming the circuit. Various levels of complexity of the DRC inspection dimensions proposed can be possible. The number and the interplay of the DRC inspection dimensions described herein can define the risk, the possible number of weak points and also the number of incorrect classifications and can be adapted and/or combined at the tolerance limit therefor.

The various DRC inspection dimensions can take account of the influencing factors which increase the risk (e.g., a larger antenna area and/or a very large well area) and/or reduce the risk (e.g., alternative protection routes).

The WA-DRC can also afford the possibility of realizing a floating well, for example without contravening established design rules in the process.

The WA-DRC can thus make it possible that the circuit to be produced is not subject to any damaging charging event. This obviates a redesign process, reduces mask costs, prevents delays in delivering a safe product and guarantees the reliability specification for various circuit applications, such as in a medical technology, space travel or automotive application. The WA-DRC can prevent for example a situation in which a large volume of a circuit is delivered with a systematic reliability problem and the products provided therewith fail prematurely.

The expression "properties" used hereinafter with regard to the circuit, e.g., a circuit element, can be understood as comprising a physical property and/or an electrical property. A physical property can comprise for example one of the following properties: chemical composition, surface area, shape, thickness (e.g., transversely with respect to the surface area), doping type, doping concentration, well type, semiconductor type, relative position in the circuit. An electrical property can comprise for example one of the following properties: impedance (e.g., reactance or resistance), electrical capacitance, electrical inductance, electrical conductivity, leakage current characteristic (or more generally a voltage-current characteristic), breakdown voltage.

FIG. 1 illustrates a method 100 in accordance with various exemplary embodiments in a schematic flow diagram. The method can be configured for the computer-aided characterization of a circuit (also referred to as circuit to be characterized).

The circuit can comprise at least one (in other words: exactly one or more than one) semiconductor component region, e.g., a plurality of semiconductor component regions. The circuit can furthermore comprise at least one (in other words: exactly one or more than one) semiconductor layer. The at least one semiconductor component region (and/or electrical lines connected thereto and/or other components connected thereto) can be electrically insulated from the semiconductor layer, for example, in at least one polarity direction (e.g., the polarity directions of the electrical charging) or both polarity directions. The semiconductor component region (also referred to as component region for short) can be embedded in an electrically insulated manner in the semiconductor layer, for example, as will be described in even greater detail later.

The at least one component region (and/or electrical lines connected thereto and/or other components connected thereto) can be electrically charged by a production process by means of which the circuit is produced. The at least one component region that is charged can have an electrical potential difference vis-à-vis the semiconductor layer (also referred to as electrical charging).

The method 100 can comprise: in 101, determining an indication representing vis-à-vis the semiconductor layer an intensity of an electrical charging of the component region by a production process, and in 103, classifying the component region taking account of the indication.

The intensity of an electrical charging can correlate for example with the electrical potential difference between the at least one component region and the semiconductor layer which is established by account of the production process. The electrical charging can be understood as energy storage brought about by the acceptance of electrical charge, e.g., in the form of an electric field which is formed in the component to be protected in reaction to the electrical charging.

The component region can comprise or be formed from a semiconductor material, for example, which is charged. The component region can alternatively or additionally comprise one or more than one semiconductor component. The component region can comprise or be formed from one or more than one semiconductor well (also referred to as well), for example.

Furthermore, a physical construction of the component region can be taken into account when determining the indication.

Optionally, determining the indication can involve taking account of an interconnection of the circuit (e.g., of the component region) and optionally the production sequence thereof.

A physical construction can generally be taken into account by means of one or more than one property (also referred to as physical properties) that correlates with the physical construction. The or each property can be mapped by means of a mapping function for example for being taken into account.

At least one of the following physical properties of the component region can be taken into account when determining 101 the indication: a thickness, a shape, a surface area (e.g., the area content thereof), a semiconductor junction type (e.g., the direction of the pn junction), a doping time, a well time (e.g., triple well), a chemical composition, a doping concentration.

The thickness of a circuit element (e.g., of the component region) can be understood to mean for example an extent transversely with respect to the lateral extent (e.g., with respect to the surface area) of the circuit element or the smallest extent of the circuit element.

Optionally, at least one of the following electrical properties of the component region can be taken into account when determining 101 the indication: an electrical capacitance with respect to the semiconductor layer; an impedance (e.g., resistance) with respect to the semiconductor layer, and/or a leakage current characteristic with respect to the semiconductor layer.

The impedance can generally be composed of the resistance (also referred to as real resistance) and the reactance. The leakage current characteristic can take account, for example, of how fast the electrical potential difference between the at least one component region and the semiconductor layer decreases automatically (e.g., in the case of a circuit which is galvanically isolated toward the outside) through the electrically insulating boundary layer thereof.

The classifying can comprise assigning the component region to at least one of two classes, of which e.g., one class represents a "safe" component region and/or one class represents a "jeopardized" component region. Illustratively, the jeopardized component region can require an adaptation of the circuit in order to reduce the risk of damage.

FIG. 2 illustrates the method 100 in a schematic flow diagram 200.

In 201, for one or more than one component region of the circuit it is possible to determine whether a charging mechanism is present which involves the component region being electrically charged vis-à-vis a semiconductor layer in which the component region is embedded in an electrically insulated manner. If it is determined that such a charging mechanism is not present, the component region can be classified 103 as "safe".

Optionally, 201 can involve determining whether the component region comprises a semiconductor junction which is electrically conductively connected by means of an antenna by means of which the electrical charging is coupled in.

By way of example, 201 can involve identifying a component region 204 embedded in an insulated manner (also referred to as insulated component region or insulated region), e.g., a component region well (also referred to as well), having one or more than one semiconductor junction (also referred to as diffusion region) connected to one or more than one metallic antenna area. By way of example, taking account of each metal/via region of the circuit and layer-resolved accumulation of the metal/via regions taken into account can be carried out.

In response to determining in 201 that the charging mechanism is present for the component region, the charging intensity indication for the component region can be determined in 101.

Generally, a design rule check (DRC) can be applied to a circuit, such as a semiconductor chip, for example, in order to determine a metal area or other area (also referred to as antenna) which can be charged or at least accept charge during production. In this context, the antenna can be understood for example such that it accepts electrical charge, e.g., more electrical charge than (e.g., instead of) electromagnetic radiation (e.g., relative to the power accepted) and/or more electrical charge than an (e.g., masking) layer surrounding the antenna. The acceptance of electrical charge can bring about for example a discharge current through a dielectric layer structure to be protected, which damages the latter (e.g., a gate dielectric of a MOS structure). The dielectric layer structure can comprise or be formed from, for example, one or more than one gate dielectric (for example one or more than one gate oxide).

The classifying 103 can classify the component region for example as "jeopardized", in response to the charging intensity indication satisfying a criterion (also referred to as classification criterion). The classification criterion can for example represent the situation if the risk of damage to the circuit is very high.

Figure 3B:
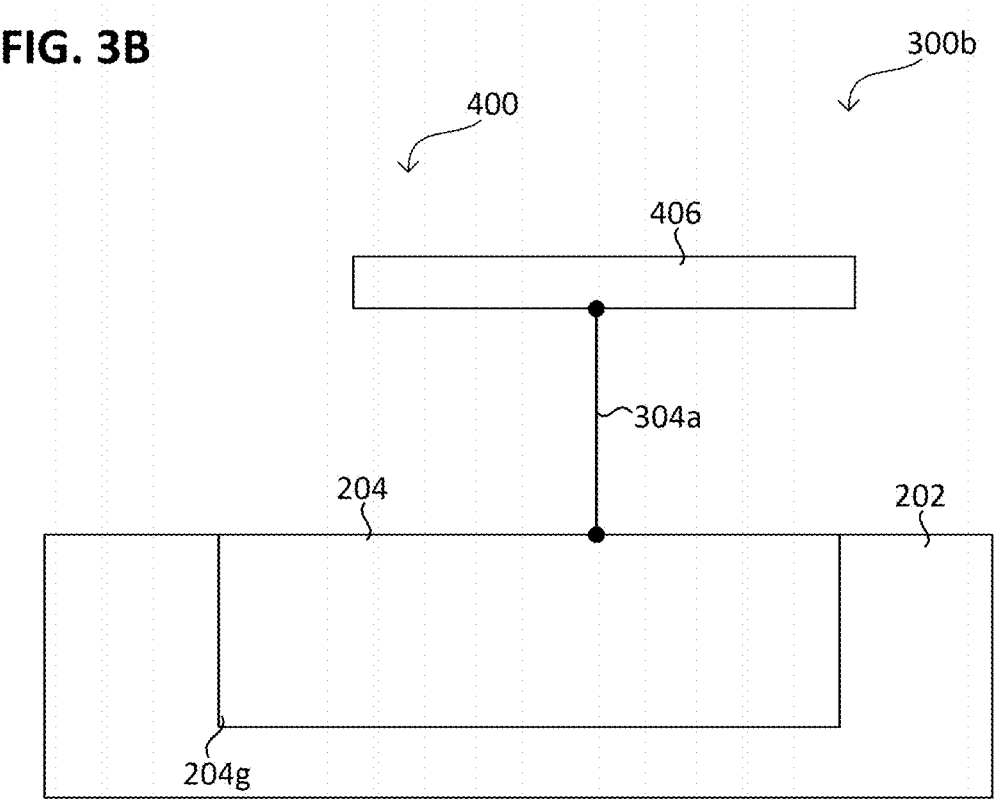

FIG. 3A and FIG. 3B each illustrate a circuit 400 in different configurations 300a, 300b, said circuit comprising a semiconductor layer 202 and a component region 204 embedded in the semiconductor layer in an electrically insulated manner, in a schematic cross-sectional view.

In accordance with various exemplary embodiments, a component region and/or a semiconductor layer (e.g., a wafer or some other suitable carrier) can be fabricated from semiconductor materials of various types, comprising a group IV semiconductor (e.g., silicon or germanium), a group III-V semiconductor (e.g., gallium arsenide) or other semiconductor types, including e.g., group III semiconductors, group V semiconductors or polymers. In various exemplary embodiments, the semiconductor layer (e.g., a substrate) is fabricated from (doped or undoped) silicon; in alternative exemplary embodiments, the semiconductor layer is an SOI wafer (silicon on an insulator). As an alternative, it is possible to use any other suitable semiconductor material for the semiconductor layer, e.g., a semiconductor compound material, such as e.g., gallium phosphide (GaP), indium phosphide (InP), but also any suitable ternary semiconductor compound material or quaternary semiconductor compound material, such as e.g., indium gallium arsenide (InGaAs).

The semiconductor layer 202 can comprise or be formed from, for example, a first semiconductor material, e.g., silicon. The semiconductor layer 202 can be exposed for example on mutually opposite sides. The semiconductor layer 202 can be for example part of a semiconductor substrate, e.g., of a semiconductor wafer.

The component region 204 can comprise or be formed from, for example, a second semiconductor material, e.g., silicon. The first semiconductor material and the second semiconductor material can optionally be identical. Alternatively or additionally, the first semiconductor material and the second semiconductor material can be doped (e.g., n-doped or p-doped), e.g., differently. By way of example, the component region 204 and the semiconductor layer 202 (or the semiconductor material thereof) can differ from one another, e.g., in terms of their doping type (also referred to as polarity of the doping, e.g., positively "p" or negatively "n" doped) and/or in terms of their doping concentration.

In accordance with various exemplary embodiments, the semiconductor layer 202 can be doped, e.g., with a first doping type (e.g., p-doped, i.e., positively doped), and the component region 204 can be embedded therein. By way of example, the component region 204 can extend into the semiconductor layer 202.

The component region 204 and the semiconductor layer 202 can be electrically insulated from one another, e.g., by means of a semiconductor junction 204g (e.g., a pn junction) and/or by means of a dielectric layer 204g. The semiconductor junction 204g can provide a current blocking configuration in at least the polarity direction of the electrical charging (also referred to as reverse polarity). The reverse polarity can comprise for example the component region 204 being charged negatively vis-à-vis the semiconductor layer 202.

By way of example, the component region 204 can be embodied as a semiconductor well 204 (also referred to as well for simplification) or be part thereof (e.g., in the semiconductor layer 202). A semiconductor well can generally denote a semiconductor region which is embedded in a semiconductor layer (e.g., a part of the substrate or an additional semiconductor well) with a different doping type than the latter. Optionally, a semiconductor well can be embodied in a multilayered fashion, i.e., comprise a plurality of (e.g., two or three) layers (also referred to as well layer) which differ from one another in their doping type and are stacked one in another.

The semiconductor layer 202 can be n-doped, for example. If the semiconductor layer is p-doped, the component region 204 can comprise at least one n-doped well layer adjoining the semiconductor layer 202, and optionally a p-doped well layer embedded in said n-doped well layer.

An electrical charging during a production process used to produce the circuit 400 can take place for example by virtue of the production process affecting a so-called antenna 406, which is electrically connected to the component region 204, e.g., introducing electrons into said antenna.

The antenna 406 denotes an electrically conductive structure (e.g., a metal layer, a via, an electrical contact, a region composed of polysilicon, etc.) which is electrically connected to the component region 204 during the production process. The antenna 406 can be interconnected for example with the component region 204, e.g., by means of a first electrically conductive path 304a, e.g., a resistively conductive connection 304a.

The antenna 406 can illustratively be understood as a receiver and/or transmitter of electrical charges. The electrical (e.g., electrostatic) charging can be brought about for example by means of an electrostatic induction and/or by means of introduction of electrical charges into the antenna 406. The antenna 406 can for example at least partly be exposed or alternatively be concealed beneath a thin insulating layer (having a thickness of a few nm) during the production process and/or be processed (e.g., changed, e.g., coated and/or removed) by the latter.

In accordance with various exemplary embodiments, various DRC inspection dimensions are implemented by means of a method for the computer-aided characterization of the circuit 400 (e.g., by means of DRC, e.g., by means of a WA-DRC and/or a router function). The router function can be implemented for example by means of a router (also referred to as wiring program).

The DRC inspection dimensions can be configured in such a way that for the or each component region 204 of the circuit 400 an indication is determined which represents an intensity with which the component region 204 is charged vis à vis the semiconductor layer 202. The indication can take account of, for example, the antenna 406 and/or the surface area thereof (e.g., that area which is subjected to the production process).

A production process (e.g., a wafer production process) which uses a plasma or other charge-based effect (also referred to as plasma process for simplification), for example can thus bring about an electrical charging of the component region 204. Such a production process can comprise for example a process of etching contacts and vias, a process of patterning aluminum metal or polysilicon lines, a PECVD process (plasma-enhanced chemical vapor deposition) that deposits intermetal dielectrics, and/or a frictional charging effect of a CMP process (chemical mechanical polishing process) or a purging step.

Such a production process can charge one or more than one metal line $406_n$ (n=1 to N) of the antenna 406, e.g., N metal lines (cf. FIG. 6), during the processing of the circuit (e.g., the wafer processing). If such a metal line 406 is connected to an insulated component region 204 in the circuit 400 and said component region 204 contacts a dielectric of the circuit 400, the dielectric can form the discharge path having the lowest resistivity, with the result that the electrical charge can be discharged through the dielectric. The discharge voltage and the tunneling current through the dielectric can damage or destroy the dielectric.

Alternatively, the damage can be a zero-hour problem in the form of a dielectric breakdown or, if a critical maximum number of cases have been reached during the process charging, a shift of a critical component parameter can occur out of a specific and/or tolerable range.

An insulated component region 204 of a circuit 400 (e.g., of a silicon bulk chip 400) can be formed for example in accordance with one of the following insulation configurations: a triple well 204, a semiconductor region 204 insulated by means of one or more than one deep trench (with or without epitaxial layers), a semiconductor region 204 formed by means of a deep n-type or p-type well, or (e.g., for a positive charge polarity) an n-doped well 204 embedded in a p-doped semiconductor layer 202 (or with the doping type interchanged) and also some other insulation configuration or a combination of wells that separates a component region 204 for the positioning of a semiconductor component from a semiconductor solid 202.

Component region 204 can be understood to mean for example the entire embedded region (e.g., composed of semiconductor material) of the circuit 400 or a resistively connected part thereof which is electrically insulated vis à vis the semiconductor layer 202.

The electrical insulation of the component region 204 vis à vis the semiconductor layer 202 can be understood herein to mean that the electrical resistance thereof with respect to one another (e.g., at the time of the electrical charging) is greater than the electrical resistance of the semiconductor layer 202 along the largest extent thereof and/or the electrical resistance of the component region 204 along the largest extent thereof. By way of example, these can be separated from one another by means of a boundary layer 204g (e.g., a pn junction 204g and/or a dielectric layer 204g), wherein the boundary layer 204g has a greater resistivity than the component region 204 and/or the semiconductor layer 202 (e.g., averaged over the entire volume thereof). The boundary layer 204g can have for example a specific conductivity of less than approximately $10^{-2}$ S/m, e.g., less than approximately $10^{-4}$ S/m, e.g., less than approximately $10^{-6}$ S/m, e.g., less than approximately $10^{-8}$ S/m.

Alternatively or additionally, the electrical resistance of the component region 204 and the semiconductor layer 202 with respect to one another or of the boundary layer 204g can be dependent on the polarity of the electrical charging (also referred to as charge polarity) and/or decrease (e.g., drop to less than one tenth) in the event of a first (e.g., dielectric or bipolar) breakdown voltage being exceeded. This first breakdown voltage can be for example greater than a second breakdown voltage of the dielectric layer structure 402s. The bipolar breakdown voltage can be for example the threshold voltage of the semiconductor junction.

Optionally, the component region 204 and the semiconductor layer 202 can be electrically isolated from one another, e.g., by means of the boundary layer 204g.

Optionally, the component region 204 can comprise a plurality of segments spatially separated from one another (e.g., a plurality of well segments of one well or a plurality of wells one in another), said segments being electrically conductively coupled among one another.

The charging of the circuit, which can result in damage to the circuit 400 as a result of the electrical charging of a component region 204 embedded in the semiconductor layer 202 in an electrically insulated manner, can be differentiated into two different mechanisms (also referred to as charging mechanisms), as will be described in greater detail below. What charging mechanism and what intensity of the charging are present can be determined by means of various inspection dimensions. The various inspection dimensions can optionally take account of the influences owing to the physical construction of the circuit which increase the risk of damage (e.g., larger antenna areas, smaller charged component regions and the combination of the two; or the position of a semiconductor component with a possible risk of degradation) and/or reduce the risk (e.g., owing to alternative protective discharge routes).

Figure 4A:
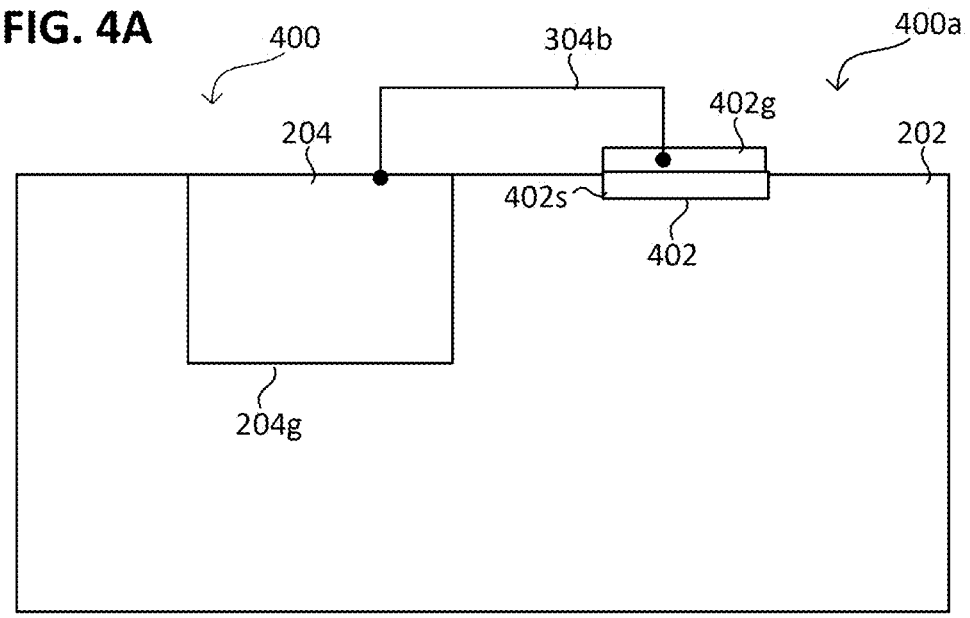
Figure 4B:
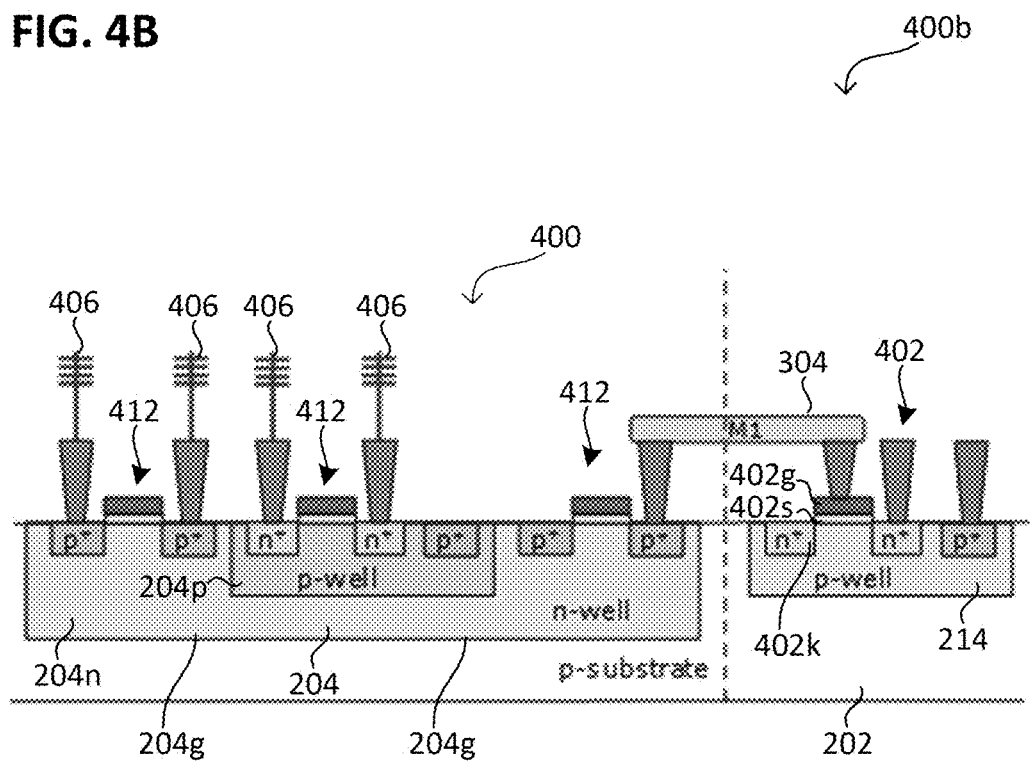

FIG. 4A and FIG. 4B each illustrate a circuit 400 in a schematic cross-sectional view in different configurations 400a, 400b, in which the circuit can be charged by a first charging mechanism (also referred to as remote well charging or RWC for short) during its production.

In configuration 400a, 400b, the circuit 400 can be configured in a manner similar to that in configuration 300a, 300b and can furthermore comprise a dielectric layer structure 402s to be protected. In configuration 400a, 400b, the dielectric layer structure 402s to be protected can be arranged at a distance (e.g., in a range of from a few µm to a few mm) from the component region 204.

The dielectric layer structure 402s, e.g., each layer of the dielectric layer structure 402s, can comprise or be formed from any kind of dielectric material (also referred to as dielectric), e.g., an oxide.

By way of example, the dielectric layer structure 402s to be protected can be arranged between the semiconductor layer 202 and an electrode structure 402g, e.g., in a manner separating these from one another. Alternatively or additionally, the electrode structure 402g can be electrically conductively interconnected 304b with the component region 204 (e.g., coupled thereto), e.g., by means of a second electrically conductive path 304b, e.g., a resistively conductive connection 304b.

The electrode structure 402g and/or the semiconductor layer 202 can adjoin for example the dielectric layer structure 402s to be protected. Alternatively or additionally, the electrode structure 402g and the semiconductor layer 202 can be electrically and/or spatially separated from one another, e.g., by means of the dielectric layer structure 402s to be protected.

The dielectric layer structure 402s and/or the electrode structure 402g can be for example part of a semiconductor component 402 to be protected, e.g., a field effect semiconductor component 402 to be protected.

The semiconductor component 402 (also referred to as component for short) can for example at least partly be embedded in the semiconductor layer 202, e.g., in a layer region or else layer regions 214, nested one in another, of the semiconductor layer 202 (also referred to as additional semiconductor component region 214 or additional component region 214), e.g., an additional well 214 (also referred to as component well). Alternatively or additionally, the component 402 can furthermore comprise one or more than one terminal 402k embedded in the semiconductor layer 202, e.g., the layer region 214 thereof.

Optionally, the dielectric layer structure 402s can adjoin the layer region 214. The layer region 214 can comprise or be formed from, for example, a well of the semiconductor layer 202, e.g., a transistor well. By way of example, a field effect component 402 to be protected can be partly embedded in the layer region 214 (e.g., it's one or more than one terminal 402k and/or its field effect region).

In the case of the remote well charging (RWC), see for example configuration 400b with a plurality of MOS transistors 402, 412, the insulated triple well 204 can be electrically charged by means of one or more than one antenna 406. The charging can be for example a result of a processing of a metal line and/or of a via (also referred to as layer feedthrough) of the antenna 406. Alternatively or additionally, the electrical charging can comprise a static charging, i.e., be free of radio-frequency effects.

Optionally, the component region 204 can comprise a plurality of layers embedded one in another, e.g., a first layer 204p embedded into a second layer 204n. The second layer 204n can electrically insulate the first layer 204p from the semiconductor layer 202, e.g., by means of a semiconductor junction 204g (e.g., a pn semiconductor junction). By way of example, the component region 204 can comprise or be formed from a triple well. The or each antenna 406 can be connected for example by means of various connections and/or components within the component region 204, e.g., the p-type well layer 204p thereof and/or the n-type well layer 204n thereof.

The circuit 400 can comprise for example an electrical connection of the n-type well layer 202n to the gate electrode 402g of a MOS transistor 402 or of a multiplicity of MOS transistors (e.g., an nMOS transistor 402), wherein the MOS transistor 402 can be embedded in the p-type substrate and/or can be arranged at a distance (e.g., in a range of from a few μm to a few mm) from the n-type well layer 204n. This electrical connection between the n-type well layer 204n and the gate electrode 402g of the MOS transistor 402 can be the main discharge path for the electrical charge collected by means of the one or more than one antenna 406. The electric current resulting therefrom can damage (e.g., destroy) the dielectric 402s of the MOS transistor 402 or at least change (e.g., impair) the operating parameters of the MOS transistor 402 as a consequence of the discharge. If the MOS transistor 402 is not situated in the charged wells 202, this configuration can be referred to as remote well charging (RWC).

To put it more generally, the RWC can affect any type of component 402, e.g., capacitor, which need not necessarily be integrated into the semiconductor layer 202 (e.g., into a semiconductor substrate), but rather comprises a dielectric layer and a top electrode, wherein the electrode can be connected to the component region 204, that is to say to the well layer 204n or 204p.

Figure 5A:
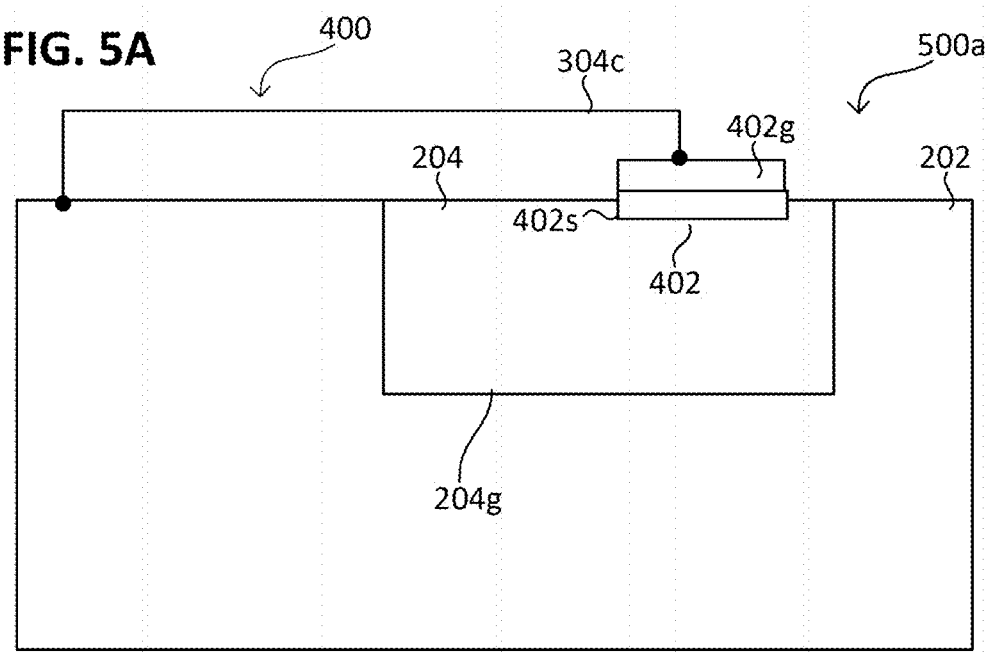
Figure 5B:
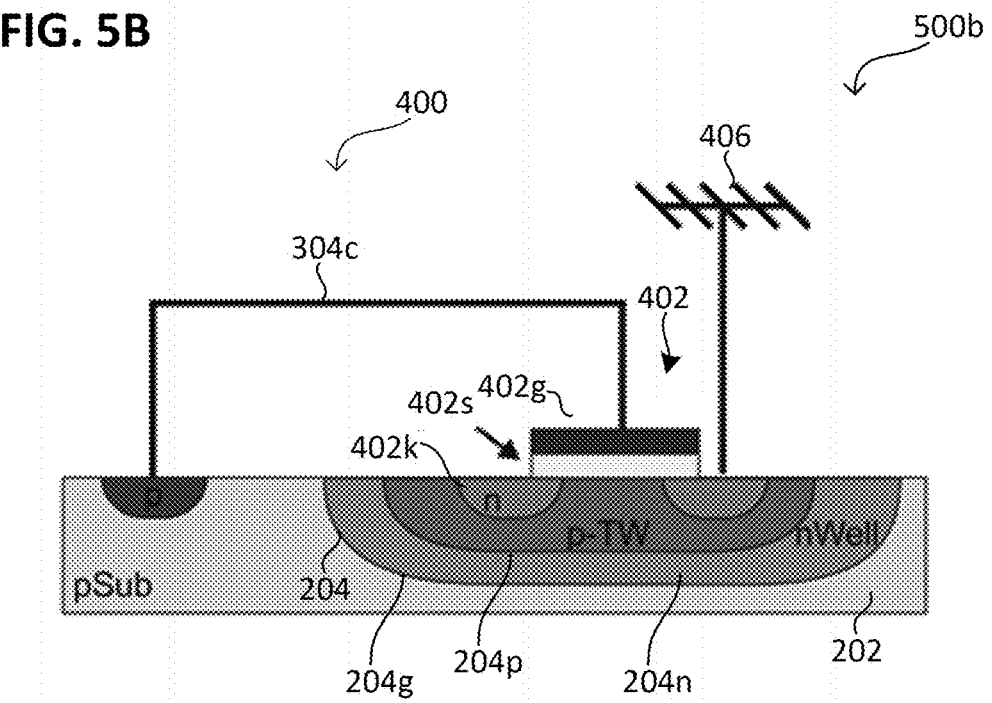

FIG. 5A and FIG. 5B each illustrate a circuit 400 in a schematic cross-sectional view in different configurations 500a, 500b, in which the circuit can be charged by a second charging mechanism (also referred to as same well charging or SWC for short) during its production.

In configuration 500a, 500b, the circuit 400 can be configured in a manner similar to that in configurations 300a, 300b, 400a or 400b, with the difference that the dielectric layer structure 402s to be protected (e.g., the dielectric thereof) adjoins the component region 204.

By way of example, the semiconductor layer 202 can be electrically conductively interconnected 304c with an electrode structure 402g (e.g., coupled thereto), e.g., by means of a third electrically conductive 304c path, e.g., a resistively conductive connection 304c. The electrode structure 402g and the component region 204 can adjoin the dielectric layer structure 402s to be protected and/or can be spatially and/or electrically separated from one another by means of the latter.

The dielectric layer structure 402s and/or the electrode structure 402g can be for example part of a component 402 to be protected, e.g., of a field effect semiconductor component 402 to be protected. The component 402 can for example be partly embedded into the component region 204 (e.g., the one or more than one terminal 402k thereof and/or the field effect region thereof).

By way of example, the component region 204 can be very strongly insulated vis àvis the semiconductor layer 202, e.g., by means of a deep trench insulation and/or by means of a vertical insulation by means of an n-type epitaxial layer 204n on a p-type substrate.

In the configuration 500b, by way of example, an insulated triple well 204 can be electrically charged by means of one or more than one antenna 406. The antenna 406 can be connected for example to a terminal (e.g., an n-doped terminal) of a MOS transistor 402 within a p-type well layer 204p (also referred to as p-doped well layer). The p-type well layer 204p can be very strongly insulated vis à vis the semiconductor layer 202 for each charge polarity, e.g., by means of an n-type well layer 204n. The gate electrode 402g of the MOS transistor 402 (e.g., nMOS transistor 402) that is partly embedded in the triple well 204 can be coupled by means of a resistive connection 304c to the wafer substrate, e.g., the semiconductor layer 202 thereof. This connection 304c can provide the main discharge path for the electrical charge collected by the antenna 406. The resulting current can flow through the dielectric 402s of the MOS transistor 402 and adversely affect (e.g., destroy) the dielectric of the MOS transistor 402 and/or change (e.g., impair) the operating parameters thereof.

If the component 402 to be protected is at least partly arranged in the charged component region 204, this case can be called same well charging (SWC).

To put it more generally, various types of a component 402 to be protected can be affected by the first charging mechanism and/or the second charging mechanism. The component 402 can be of the field effect type, for example, such as e.g., a MOS transistor (also referred to as metal oxide semiconductor field effect transistor). However, other types of components 402 to be protected can also be affected, e.g., a component 402 of the energy store type (such as, for example, a capacitor), a component 402 of the data memory type (e.g., a flash memory cell), or more generally a component 402 comprising a dielectric. Optionally, the component 402 to be protected may not yet have been fully formed when the electrical charging takes place. By way of example the component 402 to be protected can comprise at least the dielectric layer structure 402s to be protected. The dielectric layer structure 402s to be protected can comprise or be formed from one or more than one dielectric layer (e.g., composed of a gate dielectric, e.g., composed of a gate oxide).

FIG. 6 illustrates the circuit 400 in a schematic circuit diagram, e.g., in one of the configurations 400a, 400b, 500a, 500b.

Hereinafter, for describing multi-segment circuit elements, the index n is used for simplification, which index can assume a value of 1 to N, wherein N is a natural number. The value N can denote the number of segments of the circuit element and be indexed with the reference sign of the respective circuit element for differentiation. The segments of a circuit element can be electrically conductively (e.g., resistively) interconnected with one another and/or be spatially separated from one another (i.e., arranged at a distance (e.g., in a range of from a few μm to a few mm) from one another). The interconnection can be provided by means of electrically conductive connections 314a, 314b, 314c, e.g., by means of resistive (e.g., metallic) connections 314a, 314b, 314c.

The classifying can involve taking account of the interconnection of a plurality of segments of a or each circuit element (also referred to as internal interconnection). Alternatively or additionally, the classifying can involve taking account of the interconnection of a plurality of circuit elements with one another (also referred to as external interconnection).

The circuit 400 can comprise an antenna 406. The antenna 406 can comprise one or more than one antenna segment $406_n$ (n=1 to $N_{406}$), e.g., $N_{406}$ antenna segments. The or each antenna segment 406n can comprise or be formed from a metallization and/or a via, for example.

The circuit 400 can comprise a component region 204. The component region 204 can comprise one or more than one component region segment $204_n$ (n=1 to $N_{204}$), e.g., $N_{204}$ component region segments. The or each component region segment can comprise or be formed from a semiconductor well 204n, for example. Optionally, one or more than one semiconductor well 204n of the component region 204 can be segmented, i.e., comprise a plurality of well segments resistively connected to one another. By way of example, the component region 204 can comprise a network of semiconductor wells 204n coupled (e.g., resistively) to one another.

The circuit 400 can comprise a dielectric layer structure 402s. The dielectric layer structure 402s can comprise one or more than one dielectric layer structure segment $402s_n$, (n=1 to $N_{402s}$), e.g., $N_{402s}$ layer structure segments (e.g., dielectric layers). Optionally, the layers of the dielectric layer structure 402s can be spatially separated from one another (i.e., can be arranged at a distance (e.g., in a range of from a few μm to a few mm) from one another).

The circuit 400 can comprise a semiconductor layer 202, in which the component region 204 and for example the component 402 are embedded. The semiconductor layer 202 can for example be part of a semiconductor substrate or form the latter.

The circuit 400 can optionally comprise one or more than one (e.g., $N_{402}$) component 402, for example, of which each component 402 can comprise at least one layer structure segment of the dielectric layer structure 402s. The or each component can for example at least partly be embedded into the semiconductor layer 202 or into the component region 204.

The production process can introduce electrical charges (e.g., electrons) into the antenna 406, which flow away along a current path 304 into the semiconductor layer 202 and/or are neutralized with charges from the latter (also referred to as charge balancing). In this case, the greater an electric current density in the dielectric layer structure 402s, the greater the extent to which the circuit 400 can be adversely affected and/or changed (e.g., damaged).

The intensity with which the component region 204 is electrically charged vis àvis the semiconductor layer 202 defines the electrical potential difference dropped across the dielectric layer structure 402s. The greater the electrical potential difference across the dielectric layer structure 402s, the greater the current density through the dielectric layer structure 402s can be. If the potential difference across the dielectric layer structure 402s exceeds approximately 10 V, for example, a breakdown voltage of the dielectric layer structure 402s can be exceeded depending on the layer thickness thereof.

The discharge path 304 can comprise a plurality of electrically conductive paths 304a, 304b, 304c, e.g., resistively conductive connections 304a, 304b, 304c, which connect the plurality of circuit elements 406, 204, 402s, 202 to one another.

The current path 304, e.g., one or more than one electrically conductive path 304a, 304b, 304c, can comprise or be formed from an electrical (e.g., metallic) line, for example, e.g., comprising a metallization and/or via. The current path 304 can comprise a charging path 304a toward the component region 204 and a discharge path 304b, 304c away from the component region 204 through the dielectric layer structure 402s and/or into the semiconductor layer 202.

Determining the charging intensity indication can take account of, for example, one or more than one property (e.g., an interconnection and/or a physical construction) of the first electrical path 304a. The one or more than one property of the first electrical path 304a can comprise for example the impedance (e.g., reactance and/or resistance) thereof, the spatial construction thereof and/or the spatial position thereof.

Optionally, a first additional indication (also referred to as discharging intensity indication) can be determined, which represents an intensity with which the charged component region 204 discharges through the dielectric layer structure 402s. The discharging intensity indication can illustratively represent the magnitude of the expected current density through the dielectric layer structure. The additional indication can be taken into account during the classifying, for example.

Determining the discharging intensity indication can take account of, for example, one or more than one property (e.g., an interconnection and/or a physical construction) of the discharge path 304b, 304c. Determining the discharging intensity indication can take account of, for example, one or more than one property of the second path 304b, of the third path 304c and/or of the dielectric layer structure 402s.

Determining the discharging intensity indication can take account of, for example, one or more than one property (also referred to as current density property) of the dielectric layer structure 402s which represents the current density through the dielectric layer structure 402s that is brought about by the electrical charging of the component region 204, e.g., the thickness of said dielectric layer structure, the material thereof, the impedance thereof, the chemical composition thereof, the defect density thereof, and/or the breakdown voltage thereof.

Determining the discharging intensity indication can take account of, for example, an impedance (e.g., resistance) of the second path 304b and/or of the third path 304c.

Besides the discharging intensity indication, the durability of the dielectric layer structure 402s can also play a part in the adverse effect on and/or change in the circuit 400 (e.g., damage thereto). The durability of the dielectric layer structure 402s can be defined by one or more than one property (also referred to as durability property) of the dielectric layer structure 402s, e.g., the material thereof, the chemical composition thereof, the type thereof, and/or similar durability properties.

One or more than one property (e.g., durability property and/or current density property) of the dielectric layer structure 402s can be taken into account during the classifying. Alternatively or additionally, it is possible to determine a classification criterion on the basis of the one or more than one property (e.g., durability property and/or current density property) of the dielectric layer structure 402s, as will be described in even greater detail later. Illustratively, the classification criterion can take account of the fact that the dielectric layer structure 402s has a low/high durability and/or a low/high current density should be expected through this.

Optionally, determining the charging intensity indication can take account of an impedance of the one or more than one electrically conductive (e.g., resistive) connection 314a of the antenna segments 406n among one another. Illustratively, the extent of a contribution made by each of the antenna segments to the electrical charging of the component region 204 can thus be taken into account.

Optionally, determining the charging intensity indication can take account of an impedance of the one or more than one electrically conductive (e.g., resistive) connection 314b of the plurality of component region segments 204n among one another. Illustratively, the extent to which and/or how homogenously the electrical charging of the component region 204 is distributed among the component region segments 204n can thus be taken into account.

Optionally, determining the discharging intensity indication can take account of an impedance of the one or more than one electrically conductive (e.g., resistive) connection 314c (or contacting) of the dielectric layers $402s_n$ among one another (e.g., electrodes of the electrode structure that are coupled to one another). Illustratively, the extent to which the electrical discharge of the component region 204 is distributed among the dielectric layers $402s_n$ can thus be taken into account.

The or each electrically conductive (e.g., resistive) connection 314a, 314b, 314c can for example comprise or be formed from an electrical (e.g., metallic) line and/or a metal, e.g., comprising a metallization and/or via.

To put it more generally, an interaction between the electrical charging of the component region 204 and an electric current flow brought about thereby toward the component region (corresponding to the charging intensity indication) and/or away from the component region (corresponding to the discharging intensity indication) can be taken into account.

By way of example, the second electrical path 304b can comprise the electrode structure 402g (e.g., in the case of the first charging mechanism). Alternatively, the second electrical path 304b can comprise or be formed from a physical contact of the component region 204 with the dielectric layer structure 402s (e.g., in the case of the second charging mechanism).

By way of example, the third electrical path 304c can comprise the electrode structure 402g (e.g., in the case of the second charging mechanism). Alternatively, the third electrical path 304c can comprise or be formed from a physical contact of the semiconductor layer 202 (e.g., the additional component region 204p thereof) with the dielectric layer structure 402s (e.g., in the case of the first charging mechanism).

The method 100 can optionally comprise: determining a network of a plurality of wells (also referred to as well network). Optionally, a well can comprise a plurality of segments (also referred to as well segments), which are at the same potential on account of resistive connections. This holds true for example for wells which are connected in the same antenna. If the well network is determined, the physical properties (e.g., surface area) of the plurality of wells and the physical properties (e.g., surface area) of the one or more than one antenna coupled thereto can be cumulated.

Optionally, determining the component region can also involve taking account of such wells which provide no complementary logic circuit or a switching function different therefrom.

Optionally, the classifying can involve taking account of the type of the dielectric layer structure 402s. The type of the dielectric layer structure 402s can take account of one or more than one of the following physical properties of the dielectric layer structure 402s: material, chemical composition, and/or thickness (e.g., in a range of approximately 2 nm to approximately 30 nm). Illustratively, the degree to which the dielectric layer structure 402s is adversely affected on account of the charging and/or is jeopardized thereby can be taken into account.

Figure 7:
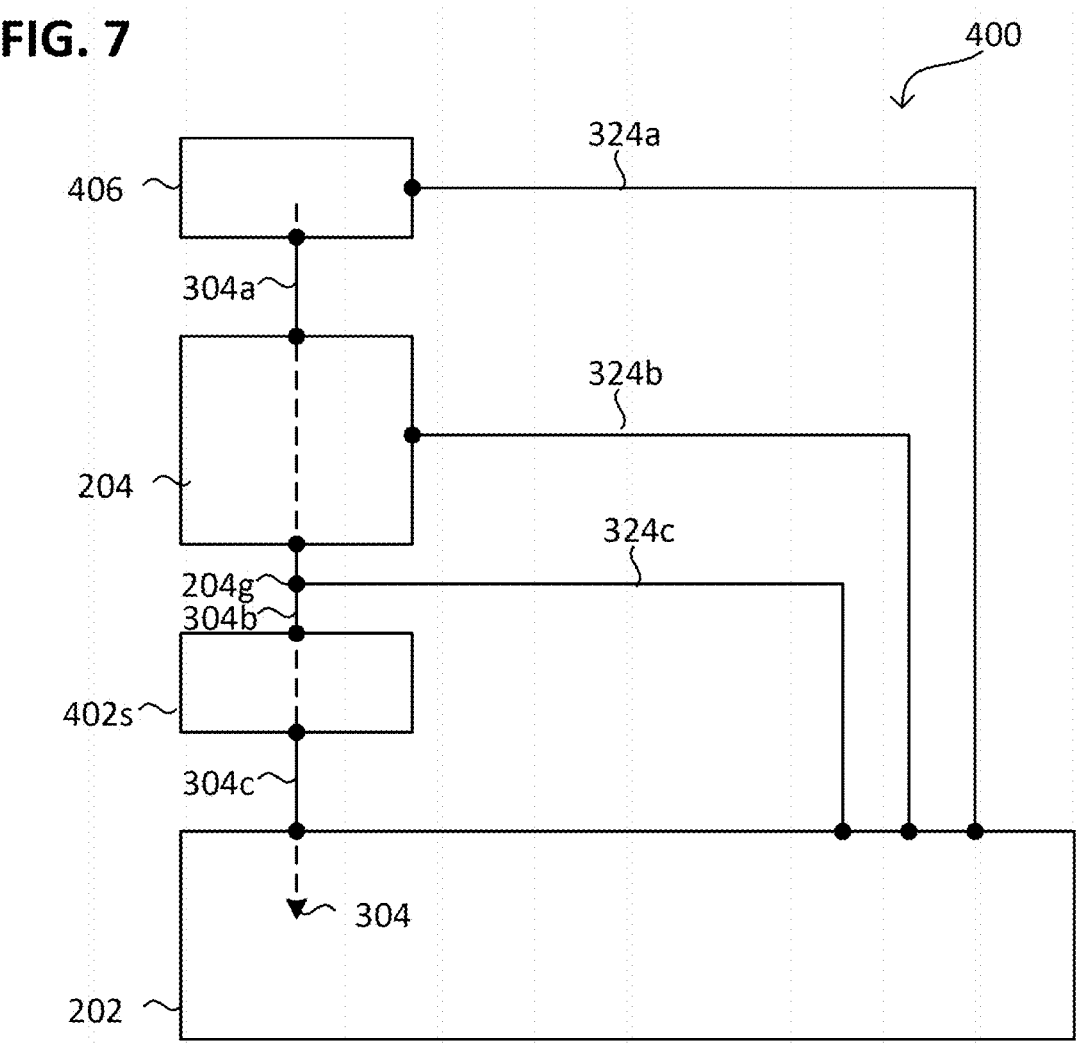

FIG. 7 illustrates the circuit 400 in a schematic circuit diagram, e.g., in one of the configurations 400a, 400b, 500a, 500b.

Optionally, the method 100 can comprise determining one or more than one electrically conductive path (also referred to as protective circuit structure) which couples a circuit element 406, 204, 402s of the circuit 400 to the semiconductor layer 202, e.g., in a manner interconnected in parallel with the third path 304c.

The or each protective circuit structure can comprise one or more than one protective component, (e.g., protective diode, contact in the semiconductor material, electrical line, metallization, via or the like). The or each protective circuit structure can comprise for example an (e.g., bipolar and/or dielectric) breakdown voltage lower than that of the dielectric layer structure 402s or a higher conductivity for the circuit structure 324a, 324b, 324c than that for the dielectric layer structure 402s.

By way of example, determining the charging intensity indication can take account of an impedance of one or more than one first protective circuit structure 324a which couples the antenna 406 to the semiconductor layer 202 in parallel with the component region 204. Illustratively, it is thus possible to take account of the extent to which the electrical charging of the antenna 406 is directly reduced, e.g., past the component region 204 and/or before it reaches the component region 204.

Alternatively or additionally, determining the charging intensity indication can take account of an impedance of one or more than one second protective circuit structure 324b which couples the component region 204 and/or the antenna 406 to the semiconductor layer 202 in parallel with the dielectric layer structure 402s. Illustratively, it is thus possible to take account of the extent to which the electrical charging of the component region 204 is directly reduced, e.g., past the dielectric layer structure 402s.

Optionally, determining the discharging intensity indication can take account of an impedance of one or more than one third protective circuit structure 324c (if present) which couples the electrode structure 402g to the semiconductor layer 202 in parallel with the dielectric layer structure 402s and/or with the component region 204. Illustratively, it is thus possible to take account of the extent to which the electrical charging of the electrode structure 402g is directly reduced, e.g., past the dielectric layer structure 402s.

As an alternative or in addition to the impedance, at least one other physical property of the one or more than one protective circuit structure 324a, 324b, 324c can also be taken into account during the classifying.

The one or more than one protective circuit structure 324a, 324b, 324c can alternatively also provide a capacitance which can accept electrical charge. In that case, as an alternative or in addition to its impedance, its capacitance can also be taken into account.

Figure 8:
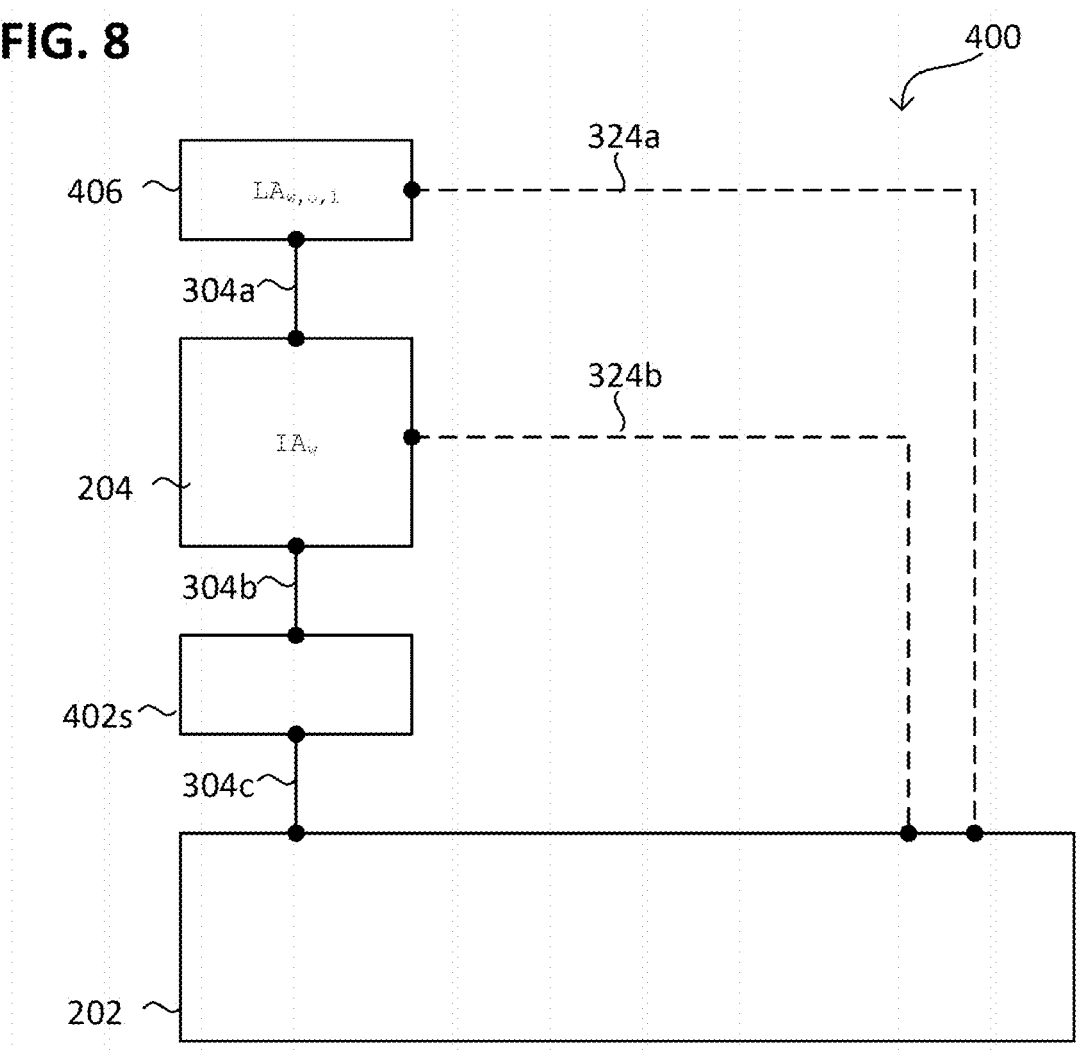

FIG. 8 illustrates the circuit 400 in a schematic circuit diagram, e.g., in one of the configurations 400a, 400b, 500a, 500b.

In accordance with various exemplary embodiments, the charging intensity indication can represent a quantity of charge accepted by the antenna 406 and/or the component region 204. The quantity of charge can be taken into account for example per area and/or per time. By way of example, the quantity of charge can be taken into account as area charge (i.e., a quantity of electrical charge per area) and/or charging rate (i.e., a quantity of electrical charge per time).

The charging intensity indication can comprise or be formed from a scalar or a mathematical function, for example. The type of mathematical function can depend on the production process, for example. However, the charging intensity indication can also comprise or be formed from a dimensionless variable.

The charging intensity indication can be dependent on one or more than one property representing the physical construction of the circuit, e.g., of the component region 204 and/or of the antenna 406 (also referred to as physical property). The one or more than one property can represent and/or comprise for example a spatial surface area, e.g., a spatial surface area of the component region 204 and/or a spatial surface area of the antenna 406.

Determining the charging intensity indication can comprise: determining a first property (also referred to as first physical property) of the one or more than one physical property representing an electrically conductive area (e.g., a laterally extended cross-sectional area and/or the area content thereof) of the antenna 406 on and/or to which the production process acts and/or transfers electrical charges, wherein the electrically conductive area is electrically (e.g., resistively) connected to the component region 204. The larger the electrically conductive area, the greater the quantity of charge accepted by the antenna 406. The first physical property can comprise or be for example an (e.g., summed) area content "$LA_{w,o,1}$" of each antenna segment "1" (e.g., each layer 1) which is able to accept electrical charges from the production process.

Determining the charging intensity indication can comprise: determining a second property (also referred to as second physical property) of the one or more than one physical property representing an electrical capacitance and/or a charge acceptance capability of the component region 406, e.g., at the interface thereof with the semiconductor layer 202. The second physical property can comprise or be for example an electrically conductive area "$IA_w$" (e.g., a laterally extended cross-sectional area and/or the area content thereof) of the component region (e.g., of the boundary layer). The larger the area content, the lower the charge transferred to the component region 204 per area.

Determining the charging intensity indication can comprise: mapping the or each physical property (e.g., the first and/or the second physical property) onto the charging intensity indication, e.g., by means of a mapping function. By way of example, the charging intensity indication can be a function of the expression $LA_{w,o1}/IA_w$ or be identical thereto. In an analogous manner, the above-described properties of the discharge path can be mapped onto the discharging intensity indication.

For this and other mapping functions or the constituents thereof, to facilitate understanding, not very complex, e.g., fractional-rational functions and polynomials of the first degree (i.e., linear terms) are used herein. In general, however, more complex functions, e.g., polynomials of a higher degree, logarithms and/or trigonometric functions, can also be used.

The classifying 103 can classify the component region 204 as "jeopardized", for example, in response to the charging intensity indication satisfying a criterion (also referred to as classification criterion), e.g., exceeding a threshold value $ARW_{w,t,o,1}$, in the event of (i.e., for example in response to) the following expression being satisfied $LA_{w,o,1}/IA_2 > ARW_{w,t,o,1}$. To put it more generally, the criterion can represent a maximum intensity with which the component region 204 is permitted to be maximally charged. The intensity of the charging can correspond for example to an electrical voltage.

However, the charging intensity indication can also be more complex, i.e., take account of more than two physical properties (e.g., more than the first and/or second physical property), as will be described in more detail below.

Figure 9:
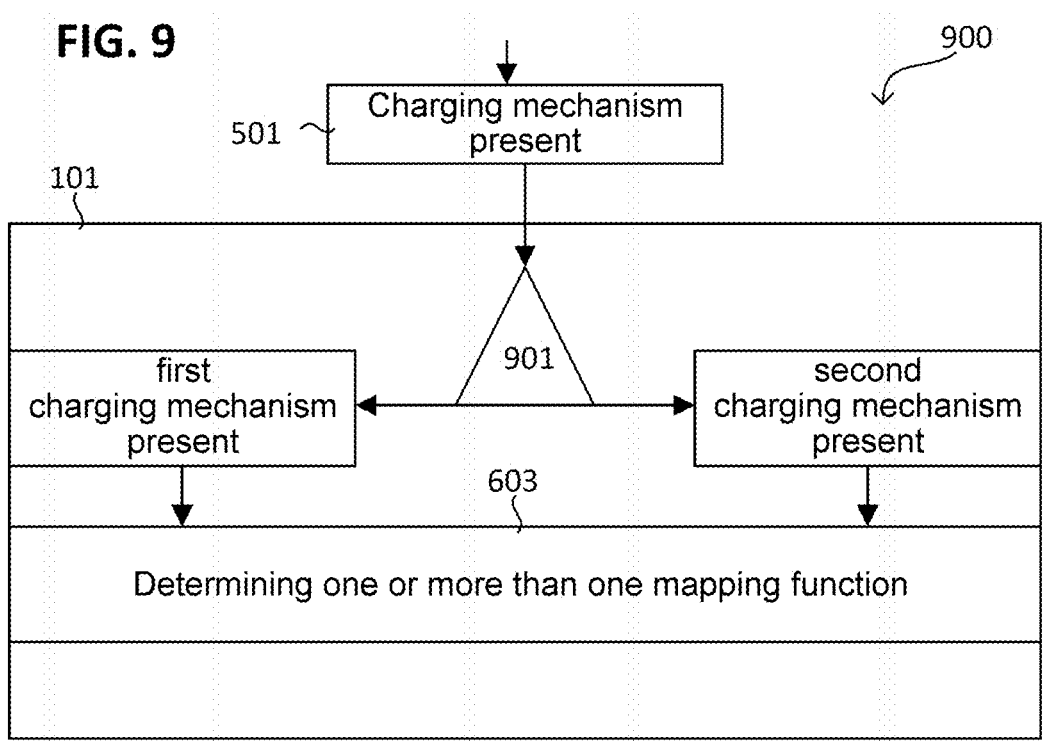

FIG. 9 illustrates the method 100 in a schematic flow diagram 900.

In 901, it is possible to determine for the charging mechanism whether the latter is the first charging mechanism or the second charging mechanism for the component 402. Combinations of both charging mechanisms can also exist in a component region. By way of example, it is possible to determine whether, for one component from the multiplicity of all components, the charging mechanism is the first charging mechanism (also referred to as RWC case), in response to not having determined that the charging mechanism is the second charging mechanism. By way of example, there may be a multiplicity of components, all of which are taken into account and are explained herein and hereinafter by way of example on the basis of "one component".

By way of example, in 901 it is possible to determine that the charging mechanism is the SWC (also referred to as SWC case) if the component region adjoins a dielectric layer structure to be protected. Furthermore, it is possible to determine that an electrode structure and the component region adjoin the dielectric layer structure to be protected (e.g., are arranged on mutually opposite sides thereof) and/or that the dielectric layer structure to be protected is arranged at a distance from the semiconductor layer.

By way of example, in 901 the SWC case can be determined if it is determined that a field effect component (e.g., a transistor, e.g., a MOS transistor) is embedded in the component region.

By way of example, in 901 the RWC case can be determined if the component region is electrically conductively coupled to a semiconductor component separated therefrom, e.g., the electrode structure thereof. Furthermore, it is possible to determine that the electrode structure and the semiconductor layer adjoin a dielectric layer structure to be protected of the component (e.g., are arranged on mutually opposite sides of said structure) and/or that the component, e.g., the electrode structure thereof and/or the dielectric layer structure to be protected, is arranged at a distance (e.g., in a range of from a few μm to a few mm) from the component region.

By way of example, in 901 the RWC case can be determined if it is determined that the component region (e.g., a semiconductor junction thereof) is electrically conductively coupled to one or more than one antenna and the component region is furthermore electrically conductively coupled to a gate of a field effect component (e.g., a transistor, e.g., a MOS transistor) outside the component region.

In general, one or more than one mapping function which map(s) one or more than one property of the circuit onto one or more than one indication 1602, 1604, 1606 (cf. FIG. 15) taken into account during the classifying can be determined 603 (e.g., selected 603) depending on the result of 901, e.g., on the basis of a set of predefined mapping functions. By way of example, a first mapping function, which maps the one or more than one physical property onto the charging intensity indication, can be determined 603 (e.g., selected 603) depending on the result of 901.

By way of example, in 603, in the event of (i.e., for example in response to) the RWC case having been determined in 901, a physical property (e.g., the surface area) of the electrode structure $GA_{w,t,o}$ can be determined. The physical property of the electrode structure can take account of the fact, for example, that the electrode structure can accept electrical charge and thus contributes to a reduction of the surface charge density.

The physical properties of the electrode structure and of the component region can be cumulated with one another. By way of example, in 603 the charging intensity indication can be a function of the expression $LA_{w,o,1}/(IA_w + C_{A,w,t,o} \cdot GA_{w,t,o})$ or be identical thereto. Optionally, the physical property of the electrode structure can be normalized, e.g., by means of a normalization parameter $C_{A,w,t,o}$, which illustratively reflects the effectiveness with which the electrode structure contributes to a reduction of the surface charge density (also referred to as protection effectiveness). If the physical property of the electrode structure is not normalized, $C_{A,w,t,o}$ equals 1 can be set. By way of example, the component region can be classified as "safe" if the expression $$LA_{w,o,1}/(IA_w + C_{A,w,t,o} \cdot GA_{w,t,o}) < ARW_{w,t,o,1} \text{ is satisfied.}$$

Alternatively or additionally, in 603, in the event of the RWC case having been determined in 901, a physical property (e.g., the well type, the doping type, the surface area, or the like) of the additional component region 214 adjoined by the dielectric layer structure 402s can be taken into account. The physical property of the additional component region can be taken into account for example by means of the normalization parameter $C_{A,w,t,o}$.

By way of example, in 603, in the event of the RWC case having been determined in 901, it is possible to identify all MOS gate dielectric interfaces which, from outside the component region 204, are connected to one or more than one segment of the component region 204 by means of a semiconductor junction, and these can be taken into account when determining the charging intensity indication (e.g., the antenna ratio calculation). Alternatively or additionally, the well type and/or the well size of the MOS component can be taken into account.

Optionally, in 603, in the event of the RWC case having been determined in 901, it is possible to determine one or more than one protective circuit structure 324c (e.g., protective diode) which is electrically coupled to the electrode structure 402g, and furthermore to take account of the effectiveness thereof with which the one or more than one protective circuit structure 324c contributes to a reduction of the surface charge density (also referred to as protection effectiveness), e.g., by means of the normalization parameter $C_{A,w,t,o}$.

By way of example, the RWC case can involve the implementation of a surface area of one or more than one component of the third protective circuit structure 324c at the dielectric layer structure 402s, e.g., of all gate protective diodes of the gate dielectric 402s, which was determined previously. On the basis thereof, it is possible to take account of the contribution thereof when determining the charging intensity indication as discharge path.

By way of example, in 603, in the event of the SWC case having been determined in 901, a physical property (e.g., the surface area and/or thickness) of the dielectric layer structure can be determined. The physical property of the dielectric layer structure can take account of the fact, for example, that the latter can influence a capacitance of the component region and/or can influence the spatial charge distribution in the component region. The physical properties of the dielectric layer structure and of the component region can be cumulated with one another in order to determine the charging intensity indication.

Figure 10:
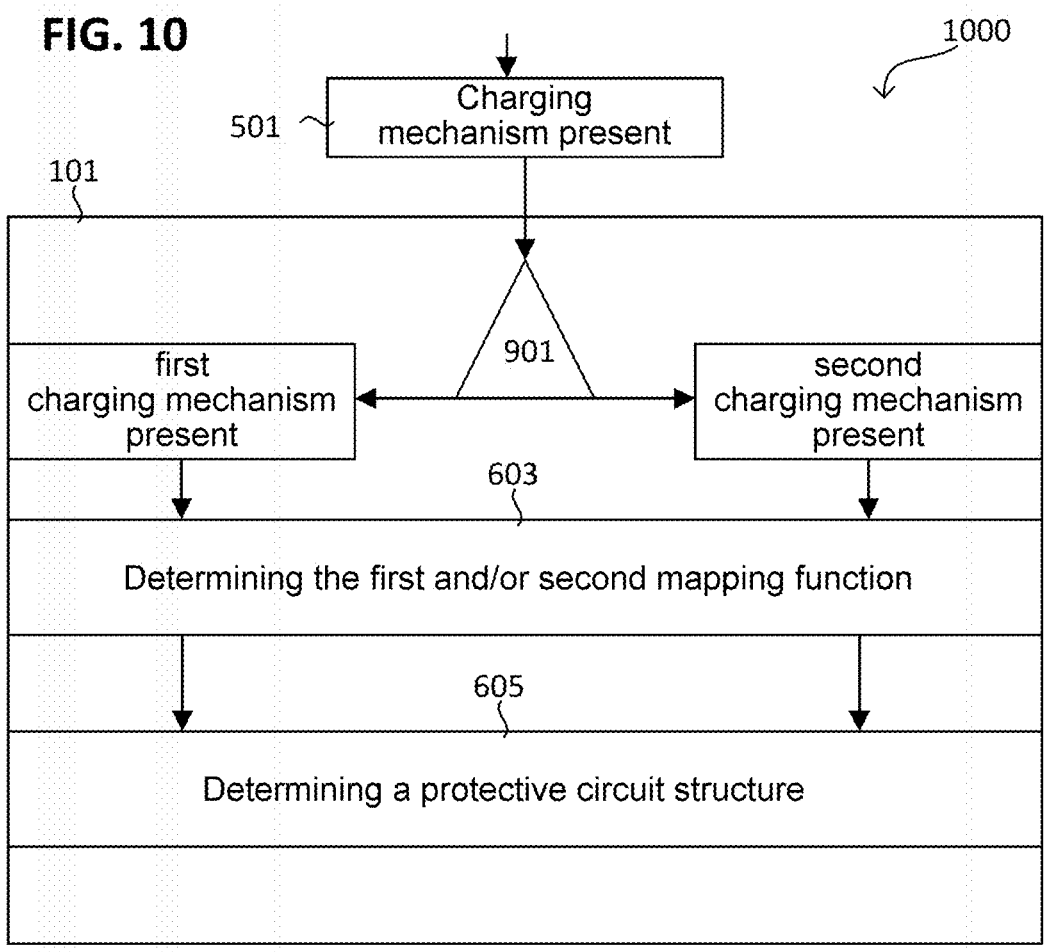

FIG. 10 illustrates the method 100 in a schematic flow diagram 1000.

To put it more generally, at least one (i.e., one or more than one) protective circuit structure can be taken into account 605 in the event of it having been determined (i.e., for example in response to the fact) that said at least one protective circuit structure contributes to a reduction of the surface charge density of the component region 204. This can be the case for the RWC case, for example, if, by means of the second protective circuit structure, the component region 204 is electrically conductively coupled to the semiconductor layer 202, e.g., at least indirectly (e.g., via the electrode structure or one or more than one semiconductor junction) or directly.

By way of example, the at least one protective circuit structure (e.g., a protective diode) can be determined 605 and taken into account. Optionally, the protection effectiveness thereof, with which the at least one protective circuit structure contributes to a reduction of the surface charge density, can be taken into account. This can be done for example by a physical property (e.g., the surface area) of the one or more than one protective circuit structure being determined and taken into account in 101.

Alternatively or additionally, one or more than one other physical property of the protective circuit structure can also be taken into account, e.g., the internal electrical interconnection thereof and/or the electrical coupling of the protective components thereof. As an alternative or in addition to the physical property, an electrical property can also be taken into account, e.g., an electrical impedance and/or capacitance of the protective circuit structure.

Alternatively or additionally, a property of the protective circuit structure which represents the electrical breakdown strength thereof can also be taken into account. By way of example, the property (e.g., a physical property) of the protective circuit structure can comprise a chemical composition and/or a layer thickness of a or each dielectric layer of the protective circuit structure.

The protective circuit structure can be taken into account for example as a normalization parameter $p_{w,t,o}$. The normalization parameter $p_{w,t,o}$ can be multiplied by the first mapping function, for example. Alternatively or additionally, a second mapping function can map one or more than one property of the circuit onto $p_{w,t,o}$.

The normalization parameter $p_{w,t,o}$ can be a function of the one or more than one property of the protective circuit structure, i.e., can take the latter into account. By way of example, the normalization parameter $p_{w,t,o}$ can represent the protection effectiveness $C_{P,w,t,o}$, with which the one or more than one protective circuit structure contributes to a reduction of the surface charge density. Alternatively or additionally, the normalization parameter $p_{w,t,o}$ can take account of the surface area $PA_{w,t,o}$ of the protective circuit structure.

By way of example, the normalization parameter $p_{w,t,o}$ can be a function of the expression $C_{P,w,t,o} \cdot PA_{w,t,o}$. By way of example, the normalization parameter $p_{w,t,o}$ in the case of the first charging mechanism (RWC case) can be proportional to the expression $1/(C_{P,w,t,o} \cdot PA_{w,t,o})$. By way of the example, the normalization parameter $p_{w,t,o}$ in the case of the second charging mechanism (SWC case) can be proportional to the expression $C_{P,w,t,o} \cdot PA_{w,t,o}$.

By way of example, the protective circuit structure can provide a discharge path which physically contacts the dielectric layer structure and/or is electrically insulated from the component region. By way of example, the protection effectiveness, with which one or more than one discharge path contributes to a reduction of the surface charge density of the component region, can be taken into account.

By way of example, the or each protective circuit structure can comprise one or more than one field effect component or one or more than one diode or the like.

By way of example, the method 100 can comprise, in the event of the SWC case having been determined, taking account of the gate surface area of the or each field effect component (e.g., of a MOS transistor) or of some other gate dielectric which was determined in the protective circuit structure. Alternatively or additionally, the method 100 can comprise, in the event of the SWC case having been determined, taking account of the gate surface area of the or each diode (e.g., the semiconductor junction thereof) which was determined in the protective circuit structure.

Figure 11:
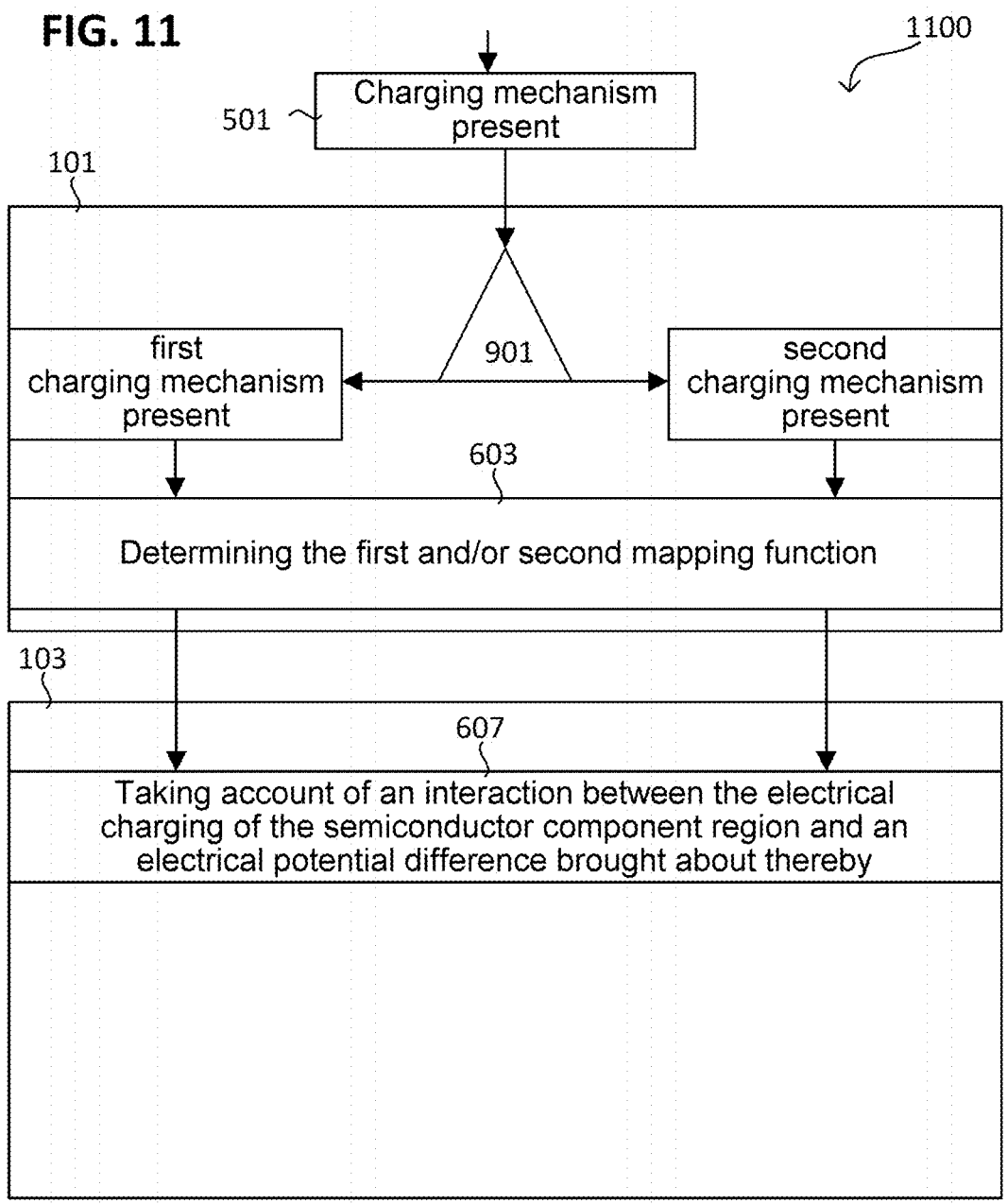

FIG. 11 illustrates the method 100 in a schematic flow diagram 1100.

The method 100 can optionally comprise: in 607, determining an electrical property of the circuit which represents an interaction between the electrical charging of the component region and an electrical potential difference brought about thereby across the dielectric layer structure. Classifying 607 the component region can be carried out taking account of the electrical property.

By way of example, it is possible to carry out a check and/or assessment of an impedance (e.g., of an ohmic resistance) for all connections of one or more than one extracted circuit element of the circuit.

The circuit element can provide for example an electrical connection between the antenna and the component region. Alternatively or additionally, the circuit element can provide for example an electrical connection between the dielectric layer structure and the component region.

By way of example, the electrical connection from the antenna to the component region (e.g., the well of the MOS transistor) can be taken into account in order to determine (e.g., to assess) the possible potential drop across the dielectric layer. The impedance between a well embedded in an insulated manner, which well is charged, and the gate dielectric can influence the impairment of the gate dielectric that is brought about. The impedance between the opposite side of the gate dielectric and the discharge path through which the damaging current would flow away can alternatively or additionally influence the impairment of the gate dielectric that is brought about. By way of example, a higher impedance can result in less damage to the gate dielectric.

To put it more generally, an interconnection of the dielectric layer structure in the circuit can be taken into account. By way of example, one or more than one current path along which the electrical charge flows away from the antenna, e.g., through the component region, the one or more than one protective circuit structure and/or the dielectric layer structure, to the semiconductor layer can be determined and/or the electrical properties thereof can be taken into account.

By way of example, one or more than one current path to the gate of an arbitrary MOS transistor arranged in the component region (e.g., the well) (e.g., in the case of the first charging mechanism) can be determined. A low-impedance or even resistive current path in the circuit (e.g., in the substrate) can be forbidden for all MOS transistors which are not situated in the circuit, or all other inspection dimensions can influence which connection cases are forbidden (i.e., result in a classification "jeopardized").

By way of example, a first electrically conductive path can be determined, along which the electrical charging by the production process is coupled in at the dielectric layer structure. Alternatively or additionally, a second electrically conductive path can be determined, along which the electrical charging flows away through the dielectric layer structure.

Figure 12:
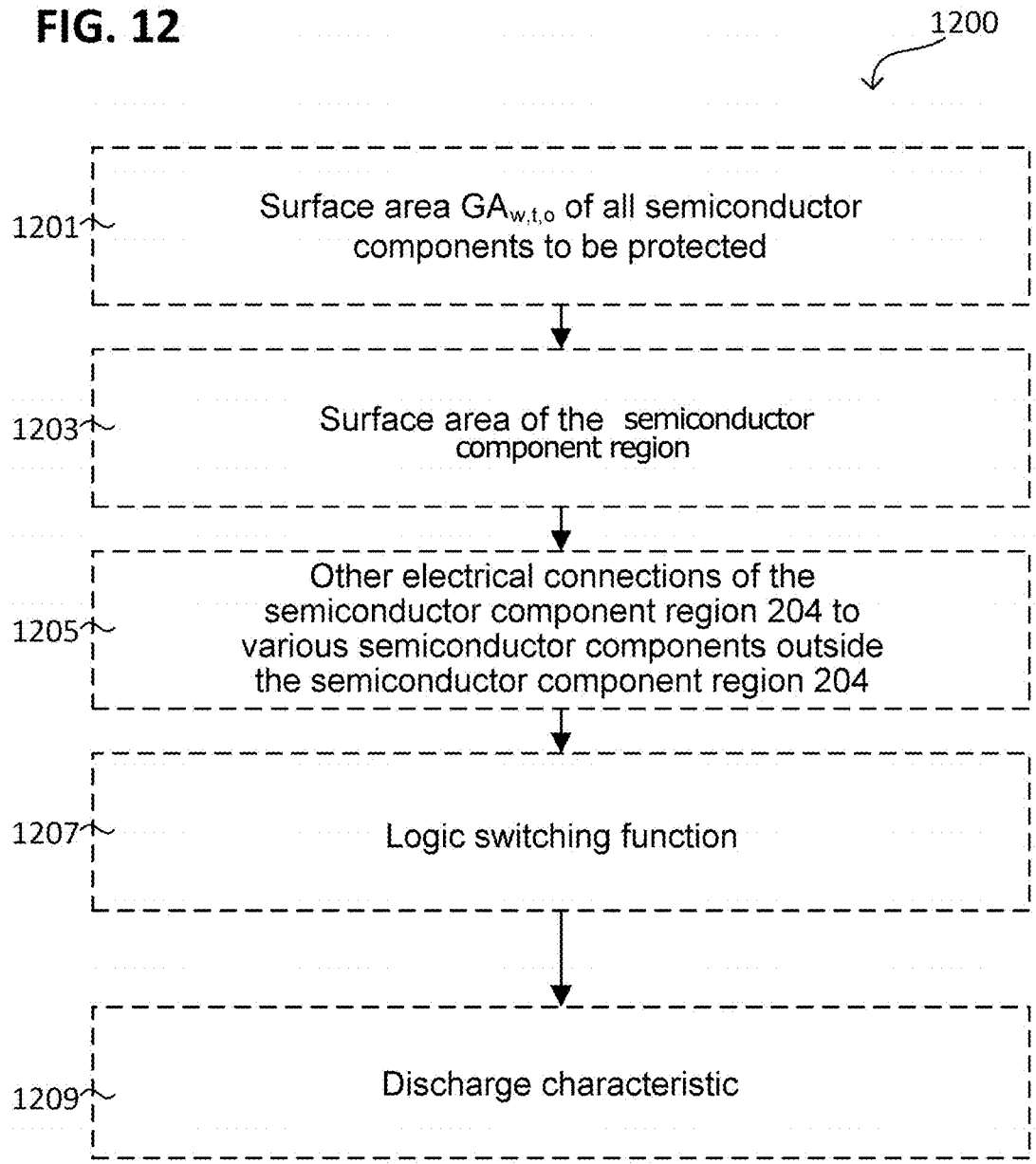
FIG. 12 shows a method in accordance with various embodiments in a schematic flow diagram.

FIG. 12 illustrates the method 100 in a schematic flow diagram 1200.

The method can take account of one or more than one of the following properties of the circuit 400 or comprise inspection dimensions corresponding thereto.

In 1201 it is possible to determine the cumulated (e.g., summed) surface area $GA_{w,t,o}$ of all components to be protected (e.g., all MOS transistor surface areas) which are arranged in the component region 202, 204 or 214. The larger the cumulated surface area $GA_{w,t,o}$ of the components to be protected, the lower the current density can be for each of the components (e.g., MOS transistors). The connection of the conductor track on the MOS gate electrode structure can optionally be determined, in order to evaluate a possible discharge through a leakage current path.

In 1203 it is possible to take account of whether the surface area $IA_w$ of the component region satisfies a criterion (e.g., illustratively is very large), e.g., exceeds a threshold value "Z", e.g., exceeds a surface area of 2 square millimeters ($mm^2$). Alternatively, the criterion Z (also referred to as reference criterion) can also be a dimensionless variable that is multiplied by the unit of the area, e.g., $\mu m^2$. The result of 1203 can be taken into account by means of an additional second indication (also referred to as inhomogeneity indication) during the classifying, e.g., as a function of the expression $IA_w/Z$. The inhomogeneity indication can be cumulated (e.g., summed) with the charging intensity indication, for example.

The reference criterion can represent a relationship between the physical construction of the component region and a reference construction. The reference construction can represent for example the threshold value for the surface area $IA_w$ of the component region which is acceptable. These properties can be mapped onto the inhomogeneity indication by means of a third mapping function, for example.

By way of example, the component region 204 can be classified as "safe" if the following relation is satisfied:

$$LA_{w,o,1}/(IA_w + C_1 \cdot PA_{w,t,o}) + IA_w/Z < ARW_{w,t,o,1}.$$

If this was determined, optionally a protective circuit structure 324b coupled to the component region 204 can furthermore be determined. By way of example, a surface area of the protective circuit structure 324b can be taken into account during the classifying. By way of example, the fact of whether or that a scaling of the surface area and/or spatial arrangement of the protective circuit structure with $IA_w$ has taken place can be taken into account. By way of example, the component region 204 can be classified as "safe" if the following relation is satisfied:

$$LA_{w,o,1}/(IA_w + C_1 \cdot PA_{w,t,o}) + IA_w/(Z + C_2 \cdot PA_{w,t,o}) < ARW_{w,t,o,1}.$$

The parameters $C_1$ and $C_2$ can be normalization parameters, for example taking account of the corresponding protection effectiveness.

Optionally, 1203 can involve taking into account, in the event of it having been determined that the surface area $IA_w$ of the component region satisfies the reference criterion, the fact of whether the component region 204 is contacted by at least one protective circuit structure at one or more than one position (also referred to as contact position). By way of example, the spatial distribution of a plurality of contact positions can be compared with a reference distribution and the classifying can take account of a result of the comparing, e.g., by means of $C_2$. Illustratively, it is possible to take account of whether each location of the component region 204 is also taken care of sufficiently by means of a protective circuit structure.

Illustratively, it is possible for example to take account of whether the surface area of the one or more than one protective circuit structure is distributed uniformly along the contour of the component region 204. For this purpose, it is possible to carry out a local check which determines the relative position of the surface area of the one or more than one protective circuit structure. If it is determined for example that the surface area of the one or more than one protective circuit structure is distributed non-uniformly, the component region 204 can be classified as "jeopardized". Alternatively or additionally, the spatial position and/or distribution of the surface area of the protective circuit structure in relation to the component region 204 can be taken into account by means of a normalization parameter $C_1$ and $C_2$.

1203 can involve determining one or more than one second protective circuit structure 324b (e.g., providing a discharge path) which electrically conductively couples the component region 204 (e.g., a well) to the semiconductor layer 202 through a semiconductor junction (e.g., a diode or some other pn junction). Optionally, it is possible to determine the position of the semiconductor junction of the second protective circuit structure 324b and/or whether said junction can contribute to a reduction of the electrical charging of the component region 204. The protective circuit structure (e.g., the protective diode), e.g., the surface area thereof, can be determined and/or adapted, e.g., on the basis of the first indication, the surface area of the antenna (e.g., metal antenna area) and/or the surface area of the component region 204 (e.g., well area).

By way of example, the component region 204 can be classified as "safe" if the following relation is satisfied:

$$LA_{w,o,1}/(IA_w + C_1 \cdot PA_{w,t,o}) < ARW_{w,t,o,1}.$$

1205 can involve determining one or more than one other electrical connection of the component region 204 to various components outside the component region 204 which contribute to counteracting (e.g., reducing and/or inhibiting) the electrical charging of the component region 204, e.g., by means of the capacitance thereof, the semiconductor junction thereof and/or the resistively conductive path thereof. The one or more than one other electrical connection in that case can provide a protective circuit structure. Alternatively or additionally, 1205 can involve determining a leakage current characteristic of the configuration of the component region 204 which is charged, and thus provides a protective circuit structure. By way of example, a network analysis (e.g., a circuit simulation) can be used, for determining the protection effectiveness with which the protective circuit structure counteracts the charging of the component region 204.

Alternatively or additionally, 1205 can involve determining one or more than one capacitance of the one or more than one electrical line 314a, 314b, 314c, 304a, 304b between the circuit elements, e.g., the antenna 406, both sides of the dielectric layer structure 402s and/or of the component region 204. Alternatively or additionally, 1205 can involve determining one or more than one capacitance of one or more than one electrical line which is connected to the circuit elements only at one end (i.e., is not part of a current path between the antenna 406 and the semiconductor layer 202) and is able to buffer a charging of the component region 204. The buffering can reduce damage to the dielectric layer structure 402s, for example, by reducing the potential difference across a dielectric layer structure 402s (e.g., a gate dielectric).

By way of example, the component region 204, in the event of the RWC case having been determined, can be classified as "safe" if the following relation is satisfied:

$$\frac{LA_{w,t,o,l}}{IA_w * C_{w,IA} * C_{w,dis}} \times \frac{C_{w,l,t,o}}{GA_{w,t,o} + C_{P,w,t,o} * PA_{w,t,o}} \leq ARW_{w,t,o,l}$$

By way of example, the component region 204, in the event of the SWC case having been determined, can be classified as "safe" if the following relation is satisfied:

$$\frac{LA_{w,t,o,l}}{IA_w * C_{w,IA} * C_{w,dis}} \times \frac{C_{G,l,t,o}}{GA_{w,t,o} + C_{P,w,t,o} * PA_{w,t,o}} \leq ARS_{w,t,o,l}$$

One or a plurality of properties can optionally take account of at least one of the following: the charging mechanism (e.g., SWC or RWC);

a doping type "t" (e.g., n- or p-doped) of the component region 204;

a thickness of the dielectric layer structure 402s (e.g., of the dielectric layer) "O";

a type of the insulation "w" of the component region 204 vis à vis the semiconductor layer 202 (e.g., semiconductor junction, dielectric, trench insulation or the like); and/or an antenna type with regard to the processed layer "1".

$LA_{w,t,o,1}$ (e.g., in μm²) denotes the surface area of the antenna 406 which accepts the electrical charge and is electrically conductively coupled to the component region 204 and/or the dielectric layer structure 402s (e.g., the component to be protected).

$IA_w$ (e.g., in μm²) denotes the surface area of the component region 204 (e.g., including a plurality of component region segments resistively connected to one another).

$C_{w,IA}$ denotes a factor representing a leakage current characteristic of the component region 204. A larger value of $C_{w,IA}$ represents a larger leakage current. By way of example, $C_{w,IA}$ can assume discrete values, such as, for instance, 0.5, 0.2 or 5, and/or can be dimensionless.

$GA_{w,t,o}$ (e.g., in µm²) denotes the surface area of the semiconductor component, of the electrode structure and/or of the dielectric layer structure 402s.

$PA_{t,w,o}$ (e.g., in µm²) denotes the active surface area of a protective circuit structure 324a, 324b, 324c which provides a leakage current (e.g., charge balancing) between two sides of the dielectric layer structure 402s and/or which is interconnected in parallel with the current density through the dielectric layer structure 402s (e.g., in a manner preventing a current flow through the dielectric layer structure 402s).

$C_{P,w,t,o}$ (e.g., dimensionless) denotes a protection effectiveness of the protective circuit structure.

$C_{w,dis}$ (e.g., dimensionless) denotes a factor representing a leakage current characteristic of a circuit element and/or of the protective circuit structure which can alternatively discharge the component region 204. A larger value of $C_{w,d}$ represents a larger leakage current. $C_{w,d}$ can assume discrete values, for example.

The classification criterion $ARW_{w,t,o,1}$ (in 1/µm²) represents for the RWC case the maximum permitted cumulated 1501 indication (e.g., antenna ratio) for the layer 1 (denotes e.g., a threshold value). If the SWC case is determined, the classification criterion $ARS_{w,t,o,1}$ can be used instead of the classification criterion $ARW_{w,t,o,1}$.

The classification criterion $ARS_{w,t,o,1}$ (in 1/µm²) represents for the SWC case the maximum permitted cumulated 1501 indication (e.g., antenna ratio) for the layer 1 (denotes e.g., a threshold value). $ARS_{w,t,o,1}$ can optionally be equal to $ARW_{w,t,o,1}$.

By way of example, the classification criterion $AR(W/S)_{w,t,o,1}$ can be determined specifically (e.g., individually) for each doping type, each class that includes the thickness of the dielectric layer structure 402s (e.g., of the dielectric layer), for each antenna type and/or for each antenna layer 1. The antenna type with regard to the processed layer can take into account, for example, which material and/or which material type the antenna comprises (e.g., polysilicon, metal, via, etc.), the chemical composition thereof, the electrical conductivity thereof and/or the relative position (in the layer construction of the circuit) in which said antenna is situated.

The threshold value $ARS_{w,t,o,1}$ can be for example in a range of approximately 0.1 to approximately 25. The threshold value $ARS_{w,t,o,1}$ can be for example in a range of approximately 0.1 to approximately 25.

$C_{w,1,t,o}$ (or $C_{G,1,t,o}$) can denote a factor which denotes a discharge characteristic (e.g., leakage current or capacitively buffered current) of an electrical line that is electrically conductively coupled to the electrode structure (e.g., physically contacts the latter), e.g., of an electrical line 324c which electrically conductively couples the electrode structure to the semiconductor layer 202. A larger value of $C_{w,1,t,o}$ (or $C_{G,1,t,o}$) can represent a smaller current. By way of example, $C_{w,1,t,o}$ (or $C_{G,1,t,o}$) can be in a range of approximately 1 to approximately 1000.

In 1207, when classifying the component region, it is possible to take account of whether the component region implements a logic switching function. The result of 1207 can be taken into account for example when determining the classification criterion.

1209 can involve determining, e.g., for the RWC case, the second electrical connection 324b between the component region 204 and the additional component region 214 (e.g., a component well). Furthermore, a discharge characteristic (e.g., time-dependent values for voltages and currents) can be taken into account during the classifying. By way of example, the discharge characteristic can be simulated. The component well can be a transistor well, for example.

Figure 13:
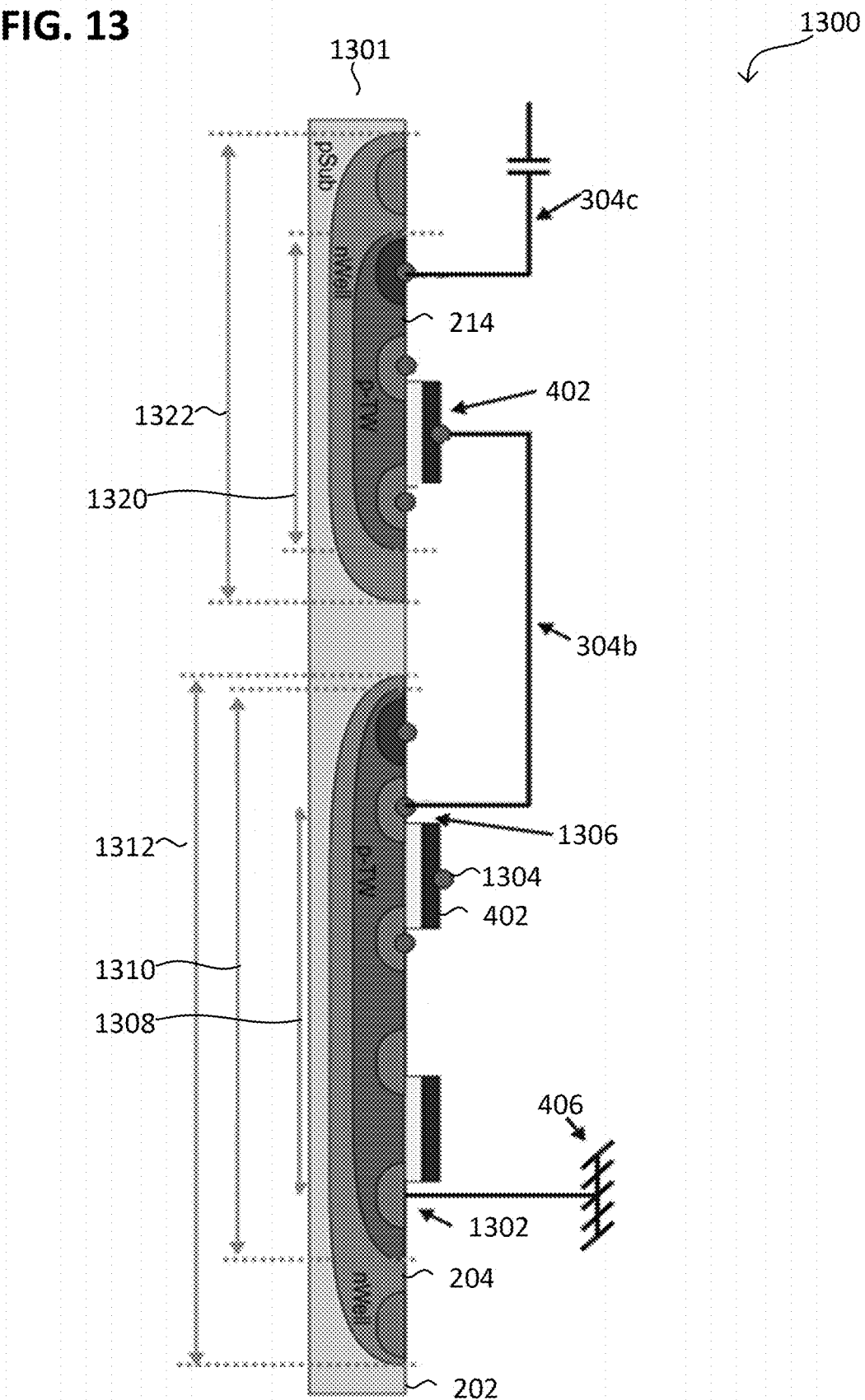

FIG. 13 illustrates a circuit 400 in a configuration 1300 in a schematic cross-sectional view.

The circuit 400 can comprise: a semiconductor layer 202 (e.g., as part of a semiconductor substrate 1301), and a multilayered component region 204 embedded in the semiconductor layer 202 (e.g., the semiconductor substrate).

The doping type of the semiconductor layer 202 adjoining the component region 204 can be taken into account during the classifying. The semiconductor substrate 1301, which comprises or is formed from the semiconductor layer 202 and the semiconductor component region 204, can be p-doped, for example.

The doping type or the number of doping types and/or well types of the component region 204 can optionally be taken into account during the classifying. The component region 204 can comprise for example an n-doped first well layer adjoining the semiconductor layer 202, and a p-doped second well layer embedded in said first well layer.

The contact type of the antenna 406 with the component region 204 can optionally be taken into account during the classifying. The antenna 406 can be electrically conductively (e.g., resistively) coupled to a semiconductor junction 1302 (pn junction) of the component region 204, e.g., with a contact of the diode type. Alternatively, the contact can be of the ohmic type. Alternatively, it is also possible for two or more than two antennas 406 to be connected to the component region 204.

A surface area of one or a plurality of antennas 406 can optionally be taken into account when determining the charging intensity indication.

The charging type can optionally be taken into account for each component to be protected or layer of the dielectric layer structure 402s.

A capacitance of the component region 204 vis à vis the semiconductor layer 202 can optionally be taken into account when determining the charging intensity indication. The capacitance of one or more than one component 1304 in the component region 204 can optionally be taken into account when determining the capacitance.

A surface area 1310 of the second well layer of the component region 204 can optionally be taken into account when determining the charging intensity indication. Alternatively or additionally, a surface area 1312 of the first well layer of the component region 204 can be taken into account when determining the charging intensity indication.

An impedance (e.g., ohmic resistance) of the electrical connection 304b of the component region 204 to a component 402 to be protected can optionally be taken into account when determining the discharging intensity indication. The contact type 1306 of the electrical connection 304b to the component region 204 can optionally be taken into account when determining the impedance. The electrical connection 304b can be electrically conductively (e.g., resistively) coupled to a semiconductor junction 1306 (pn junction) of the component region 204, e.g., with a contact of the diode type. Alternatively, the contact can be of the ohmic type. Alternatively, a plurality of couplings 304B can also be present.

A type of the dielectric layer structure 402s can be taken into account when determining the discharging intensity indication, e.g., whether said structure comprises a gate dielectric. A thickness and/or a surface area of the dielectric layer structure 402s can optionally be taken into account when determining the discharging intensity indication. Alternatively, more than two layer structures 402s can be present and be connected in parallel with the component region 204. The area of all component regions 402 can then be cumulated in order to determine the discharging intensity indication.

A discharge path 304c and/or its impedance and/or capacitance can optionally be taken into account when determining the discharging intensity indication. Alternatively, a multiplicity of discharge paths 304c out of the additional component region 214 can exist, all of which can be taken into account.

Optionally, it is possible to take account of a distance 1308 between the antenna contact 1302 and the contact 1306 of the electrical connection 304b, or some other property representing their spatial position with respect to one another.

The additional component region 214 of the semiconductor layer 202 can comprise a first well layer and optionally a second well layer embedded therein.

A surface area 1320 of the second well layer of the additional component region 214 can optionally be taken into account when determining the discharging intensity indication. Alternatively or additionally, a surface area 1322 of the first well layer of the additional component region 214 can be taken into account when determining the charging intensity indication.

By way of example, the method 100 can comprise taking account of one or more than one of the following properties (e.g., during the determining 101 and/or during the classifying 103).

- A surface area of one and/or more than one antenna 406, e.g., two or more than two antennas 406 connected in parallel with one another, (also referred to as antenna area), i.e., the antenna area which is processed by the production process and which accepts the charge. A larger antenna area results in more accepted electrical charge and increases the risk of damage to the circuit.
- A dielectric surface area of the component which is coupled to the component region 204 and/or which is jeopardized by the discharge current. A smaller surface area (for example the channel width W times the length L of a transistor) results in a higher current density through the dielectric and thus to greater damage if the antenna 406 is charged.
- A leakage current characteristic of the insulated component region 204 (can be dependent on the polarity of the doping, i.e., the doping type). The stronger the insulation with regard to its resistance and/or its breakdown voltage, the lower the risk of damage to the component.
- The leakage current characteristic and/or the impedance (e.g., electrical resistance) of the component whose dielectric can be damaged. If the component is arranged in a small (e.g., with a surface area in a range of approximately 10 $\mu m^2$ to approximately 1000 $\mu m^2$), strongly insulated additional component region 204 and there are no paths having a low resistivity vis à vis the semiconductor layer 202 (e.g., the substrate), the risk of damage can be low. By way of example, the component cannot be damaged or can hardly be damaged if there were (illustratively almost) no current flow through the dielectric if the component region 204 has been completely charged.

Determining the leakage current characteristic can take account of the type of insulation (also referred to as insulation type), the type of well configuration and/or the electrical behavior thereof (including at elevated temperatures that the substrate may have during the production process) of the component region 204 vis à vis the semiconductor layer 202. By way of example, the insulation type can be one of the following insulation types: deep trench insulation, bipolar semiconductor junction insulation (e.g., pn or np), tripolar semiconductor junction insulation (e.g., pnp or npn). By way of example, the type of well configuration can be one of the following types: deep well configurations, epitaxial layer configurations, triple well configuration or standard well configuration.

Determining the leakage current characteristic can take account of the surface area of the insulated component region 204. The smaller the surface area, the greater the risk of damage to the circuit can be since the resistance of the component region 204 with respect to the substrate increases and the electrical capacitance thereof decreases.

FIG. 14 illustrates a method 1400 in accordance with various exemplary embodiments in a schematic flow diagram.

The method 1400 can comprise in not providing a circuit model doom describing the physical construction and/or the interconnection of the circuit 400 (also referred to as product design), e.g., in the time profile 1502 of the processing. The circuit model can comprise at least one spatial coordinate 1504, e.g., a first spatial coordinate and/or a second spatial coordinate and optionally a third spatial coordinate. Optionally, the circuit model can furthermore comprise a temporal coordinate 1502. The temporal coordinate can describe for example the change in the circuit in the course of the production thereof, e.g., the change in the circuit 400 that is brought about by each subprocess 15a, 15b, 15c, 15d of the production process.

The method 1400 can comprise in 1103: carrying out a method 100 for the computer-aided characterization of a circuit, e.g., using the circuit model. The result from 1103 can comprise the fact that those component regions 400 of the circuit 400 whose electrical charging potentially jeopardizes the circuit (i.e., such that the risk of being damaged during production satisfies a criterion) are classified 1506 (e.g., marked 1506), e.g., by their being assigned to the class "jeopardized".

By way of example, the classifying can be carried out for a plurality (e.g., each) of subprocesses 15a, 15b, 15c, 15d of the production process or at least for those subprocesses 15a, 15b, 15c, 15d of the production process which bring about an electrical (e.g., electrostatic) charging.

The method 1400 can comprise for example in 1506: determining whether, which or that at least one component region 204 was classified as "jeopardized". In response to the result of 1506, the method 1400 can optionally comprise in 609: adapting the circuit model on the basis of a result of the classifying, e.g., on the basis of a data set 1522 created therefrom. Adapting the circuit model doom can comprise for example adding an electrical connection and/or a protective circuit structure 404 to the circuit model doom.

Optionally, in 1111, a method 100 for the computer-aided characterization of the circuit can be carried out once again on the basis of the adapted circuit model. The carrying out 1103 and adapting 609 can be effected for example as often as until it has been determined in 1506 that no component region 204 was classified as "jeopardized".

In accordance with various exemplary embodiments, the method 1400 can be carried out 1551 by means of a processor 1524p. By way of example, in accordance with various exemplary embodiments, a device 1524 (e.g., a computer, a mobile device or the like) can be provided, which comprises the processor 1524p (and optionally a storage medium 1526), wherein the processor 1524p is configured to carry out one of the methods described herein.

Optionally, only some parts of the method can be carried out by means of the processor 1524p.

The storage medium 1526 can be part of the device 1524 and/or be provided separately therefrom, and can be for example an electronic semiconductor storage medium, e.g., a read only memory (ROM) or a random access memory (RAM), e.g., an (M, S, D, F) RAM or a (P, E, EE, Flash-EE) ROM storage medium, a memory card, a flash memory, a stick for a universal serial bus (USB stick), a solid state drive (SSD), a hard disk drive (HDD), a memory disk (MD), an exchangeable storage medium, a holographic storage medium, an optical storage medium, a compact disk, a digital versatile disk (DVD), a magneto-optical disk or some other storage medium.

The code segments can represent the circuit model doom in accordance with various exemplary embodiments. Alternatively or additionally, the code segments can represent a database 1522 (or some other data set) containing at least one parameter set representing the circuit 400. The database (or the data set) can alternatively or additionally be configured to construct the circuit model doom in accordance with various exemplary embodiments.

In accordance with various exemplary embodiments, the device 1524 can comprise the processor 1524p configured to simulate a circuit 400 on the basis of a circuit model doom in accordance with various exemplary embodiments. By way of example, the processor 1524p can execute the code segments, which are stored e.g., on the computer-readable storage medium 1526, e.g., via a bus system of the device 1524 and/or a network, or said code segments are fed and/or provided to said processor in some other way. By way of example, the processor 1524p can process the circuit model doom and/or the data set 1522. Optionally, the processor 1524p can be configured to construct the circuit model doom using the data set 1522 (e.g., the database) and/or to update the data set on the basis of the adapted circuit model doom. Alternatively or additionally, the processor 1524p can be configured to generate and/or to modify the data set 1522 in accordance with a result of the method.

The processor 1524p can be configured for computation operations. By way of example, the processor 1524p can comprise or be formed from a microchip, e.g., an integrated microchip. By way of example, the processor 1524p can comprise or be formed from a CPU (central processing unit) or a GPU (graphics processing unit). The processor 1524p can optionally be a multi-core processor. The processor 1524p can optionally be connected to a bus system of the device.

Optionally, 1131 can involve producing the circuit 400, e.g., on the basis of and/or in accordance with the circuit model doom.

The method 100 can comprise for example: determining (e.g., identifying) relevant well configurations and/or well networks.

The method 100 (e.g., an antenna DRC) can be carried out layer by layer for each segment and/or each antenna layer of the antenna 406. All antennas can for example be checked and these can be taken into account during the classifying.

The method can comprise: determining one or more than one (e.g., each) protective circuit structure of the circuit and/or determining one or more than one required protective circuit structure. An extraction of existing and a decision about additional protective circuit structures can be provided, for example.

The charging intensity indication of the global rule check in the DRC is dependent for example (e.g., solely) on the area of all well segments, and for example an increasing risk of impairment may arise for an increasing well surface area (even given a constant antenna ratio) or damage to the component may occur for a decreasing (e.g., very small) well surface area with a large antenna ratio. Therefore, the antenna ratio calculation can be generated with two additive terms, both of which contribute to the antenna ratio. The global check characterizes the identified well as a construct and checks the latter with respect to a classification criterion (e.g., a predefined antenna ratio).

In the case where one or more than one required protective diode is determined, the position of the protective diode can be determined and taken into account by means of a local rule check. For this purpose, the well can be subdivided into individual segments, wherein each segment can require a protective diode (with surface area corresponding thereto). In this regard, a separate adaptation of the circuit can be carried out, which positions a protective diode in large well configurations, e.g., in accordance with a predefined grid and/or every 0.1-2 mm in north/south and east/west directions of a logic circuit block of the circuit produced. The local check segments the well illustratively in order that a plurality of protective diodes are distributed uniformly over the entire well.

FIG. 15 illustrates a method 1500 in accordance with various exemplary embodiments in a schematic flow diagram. The method 1500 can comprise determining at least one (i.e., exactly one or more than one) indication, e.g., a first indication 1602 (also referred to as charging intensity indication), an optional second indication 1604 (also referred to as discharging intensity indication), and an optional third indication 1606 (also referred to as inhomogeneity indication).

The inhomogeneity indication 1604 can represent an intensity with which the accepted electrical charge is distributed inhomogenously in the component region 204.

A plurality or all of the indications of the at least one indication can be cumulated 1501 with one another, e.g., by their being mapped onto a result 1608 (also referred to as antenna ratio 1608) of the cumulating by means of a mapping function. The cumulating 1501 can comprise for example an addition and/or multiplication of two indications. However, more complex mathematical combinations can also be used for the cumulating 1501.

The classifying 103 can be carried out using the result 1608 of the cumulating. The classifying 103 can comprise for example determining whether the result 1608 of the cumulating satisfies the classification criterion.

FIG. 16 illustrates a method 1600 in accordance with various exemplary embodiments in a schematic flow diagram.

The method can comprise in 1551: providing a circuit model (e.g., a layout).

The method 1600 can comprise in 1553: carrying out the method 100 using the circuit model (e.g., carrying out a design rule check and/or a router pass). Carrying out the method 1600 can be effected using the classification criterion and/or optionally be repeated 551.

Carrying out 1553 the method 100 can comprise, in 1555, taking account of one or more than one of the following: an antenna ratio that is permitted (e.g., by means of the classification criterion); one or more than one protective circuit structure and optionally the protection effectiveness thereof; networks to be identified; and/or effects of capacitances and impedances (e.g., resistance or reactance); strength of an insulation of the component region to which the antenna and/or the dielectric layer structure (e.g., the dielectric) are/is coupled.

The method 1600 can comprise in 1701: determining whether at least one semiconductor component region 204 was classified as "jeopardized" in 100 (e.g., determining the component region which is charged). Illustratively, it is possible for example to check whether a critical insulator case was determined.

The method 1600 can comprise in 1559: if it is determined in 1701 that no semiconductor component region 204 was classified as "jeopardized", ending the method 1600.

The method 1600 can comprise in 1561: if it is determined in 1701 that at least one semiconductor component region 204 was classified as "jeopardized", storing a data set of each component region of the circuit which was classified as "jeopardized", and optionally the properties thereof.

The method 1600 can comprise in 1563: manually or automatically adapting (correcting) the circuit, e.g., by one or more than one bridge (e.g., an electrical line) and/or one or more than one protective circuit structure being added to the circuit.

The adapting 1563 can comprise, in 1565, taking account of one or more than one property. The one or more than one property can comprise and/or define the following, for example: one or more than one protective circuit structure and the protection effectiveness thereof; effects of capacitances and impedances (e.g., resistance or reactance); and/or strength of an insulation of the component region to which the antenna and/or the dielectric layer structure (e.g., the dielectric) are/is coupled.

In accordance with various exemplary embodiments, it is possible to increase the robustness of an arbitrary complex integrated circuit (also referred to IC) vis à vis production process charge damage, for example with respect to the reliability of the circuit. This also increases the reliability of any system in which the circuit is used.

The DRC for the electrical charging of a well can be configured in such a way that the relevant elements, regions and/or the location thereof with respect to the semiconductor layer are/is taken into account. The DRC can address the correct interfaces of the circuit. The DRC can add a protective circuit structure to the circuit for example only if it was determined that there is a significant risk of damage to the circuit. Illustratively, it is possible to implement a differentiation between global and local checking of the circuit, which enables for example appropriate protection for very large semiconductor component regions.

The DRC can be configured in such a way as to determine critically large regions of the circuit which are processed by means of the production process and the electrical charging of which passes to an insulated component region (e.g., of a triple well or of a deep trench) and can destroy or damage a dielectric layer (e.g., a gate oxide) coupled thereto.

In accordance with various exemplary embodiments, one or more than one of the above properties of the circuit can be determined or taken into account. The more of the above properties of the circuit that are taken into account, the more accurately the DRC can determine a risk of damage. This can alternatively or additionally reduce the outlay required for adapting the circuit, for example since fewer protective circuit structures need be added.

The description given above in respect of a component region can analogously also apply to other regions of the circuit which are embedded into the semiconductor layer (e.g., a substrate) in an electrically insulated manner (more generally also referred to as insulated region).

In many circuit technologies, insulated regions in the substrate are designed in such a way that a voltage of approximately 10 volts (V) can be applied to them, without giving rise to leakage currents from the regions to the semiconductor layer, e.g., even at a relatively high temperature of the circuit. Such relatively high temperatures can occur e.g., in the case of use in the automotive field and/or in the motor field.

In the case of a relatively thin dielectric oxide (e.g., having a thickness of approximately 5 nm or less), a voltage of 10 V dropped across the oxide can destroy or severely damage the oxide. If a thin gate dielectric (e.g., gate oxide) is connected to such an insulated region which is electrically charged by means of an antenna during the production process, the gate dielectric can become the main discharge path of the electrical charge and the gate dielectric can be destroyed.

Various examples are described below, these examples referring to descriptions given above and illustrations shown in the figures.

Example 1 is a method 100 for the computer-aided characterization of a circuit 400 comprising a semiconductor layer 202 and a semiconductor component region 204 (e.g., a semiconductor well) embedded in the semiconductor layer 202 in an electrically insulated manner, wherein the semiconductor component region 204 is optionally coupled to a dielectric layer structure to be protected; the method 100 comprising: determining an indication 1602 (e.g., the weighted area ratio) representing vis-à-vis the semiconductor layer 202 an intensity of an electrical charging of the semiconductor component region 204 by a production process used to produce the circuit 400, wherein a physical construction of the semiconductor component region 204 is taken into account when determining the indication 1602; and classifying the semiconductor component region 204 taking account of the indication 1602.

Example 2 is the method 100 in accordance with example 1, wherein a spatial surface area of the semiconductor component region 204 is taken into account when determining the indication 1602.

Example 3 is the method 100 in accordance with example 1 or 2, wherein determining the indication 1602 involves taking account of whether the semiconductor component region 204 has a semiconductor junction by means of which the electrical charging is coupled in.

Example 4 is the method 100 in accordance with any of examples 1 to 3, wherein the classifying involves taking account of whether the semiconductor component region 204 adjoins the dielectric layer structure to be protected.

Example 5 is the method boo in accordance with any of examples 1 to 4, wherein the classifying involves taking account of whether the semiconductor component region 204 is electrically conductively coupled to an electrode structure, wherein the electrode structure and the semiconductor layer 202 adjoin the dielectric layer structure to be protected (e.g., are arranged on mutually opposite sides thereof), which is arranged at a distance from the semiconductor component region 204.

Example 6 is the method boo in accordance with example 5, wherein the semiconductor layer 202 comprises an embedded additional semiconductor component region 204 adjoining the dielectric layer structure, wherein determining the indication 1602 involves taking account of a physical and/or electrical construction of the additional semiconductor component region 204 (e.g., well type, doping type, and/or surface area).

Example 7 is the method boo in accordance with any of examples 1 to 6, wherein determining the indication 1602 involves taking account of a physical construction of the dielectric layer structure to be protected and/or of the electrode structure (e.g., the surface area thereof).

Example 8 is the method boo in accordance with any of examples 1 to 7, furthermore comprising: determining a property (e.g., chemical composition and/or layer thickness) of the dielectric layer structure, wherein the property of the dielectric layer structure represents an electrical breakdown strength of the dielectric layer structure; wherein classifying the semiconductor component region 204 is furthermore carried out taking account of the property of the dielectric layer structure.

Example 9 is the method boo in accordance with any of examples 1 to 8, wherein classifying the semiconductor component region 204 involves taking account of whether the dielectric layer structure is physically contacted by a discharge path (e.g., to the semiconductor layer 202) that is electrically insulated from the semiconductor component region 204.

Example 100 is the method 100 in accordance with example 9, furthermore comprising: determining a property of the discharge path which represents an impedance of the discharge path, wherein classifying the semiconductor component region 204 is furthermore carried out taking account of the property of the discharge path.

Example 11 is the method 100 in accordance with example 9 or 10, wherein the impedance comprises a leakage current impedance of the discharge path.

Example 12 is the method 100 in accordance with any of examples 9 to 11, wherein the discharge path comprises one or more than one field effect component outside the semiconductor component region 204.

Example 13 is the method boo in accordance with any of examples 1 to 12, furthermore comprising: determining a (e.g., electrical or physical) property of the circuit 400 which represents an interaction between the intensity of the electrical charging of the semiconductor component region 204 and an electrical potential difference brought about thereby across and/or electric field strength brought about thereby in the dielectric layer structure; wherein classifying the semiconductor component region 204 is furthermore carried out taking account of the property of the circuit 400.

Example 14 is the method 100 in accordance with any of examples 1 to 13, furthermore comprising: determining an interconnection of the dielectric layer structure in the circuit 400, wherein classifying the semiconductor component region 204 is furthermore carried out taking account of the interconnection of the dielectric layer structure.

Example 15 is the method boo in accordance with example 14, wherein determining the interconnection of the dielectric layer structure furthermore comprises determining an impedance of the interconnection.

Example 16 is the method 100 in accordance with any of examples 1 to 15, wherein determining 101 the indication 1602 and/or classifying 103 involve(s) taking account of whether the dielectric layer structure comprises a plurality of dielectric layers which are arranged at a distance from one another and are electrically (e.g., resistively) coupled to one another.

Example 17 is the method 100 in accordance with example 16, wherein determining 101 the indication 1602 and/or classifying 103, for each layer of the dielectric layer structure, involve(s) taking account of whether the dielectric layer structure is part of a field effect component of the circuit 400.

Example 18 is the method 100 in accordance with any of examples 1 to 17, furthermore comprising: determining an electrically conductive path along which the electrical charging by the production process (e.g., in the circuit 400, e.g., into the semiconductor layer 202) is coupled in, determining a property of the electrically conductive path which represents an impedance of the electrically conductive path, wherein classifying 103 the semiconductor component region 204 is furthermore carried out taking account of the property of the electrically conductive path.

Example 19 is the method 100 in accordance with any of examples 1 to 18, furthermore comprising: determining a protective circuit structure 400, which is electrically coupled to the semiconductor component region 204, wherein a property of the protective circuit structure and/or of the electrical coupling between the protective circuit structure and the semiconductor component region 204 is taken into account when determining the indication 1602.

Example 20 is the method 100 in accordance with example 19, furthermore comprising: wherein the property of the protective circuit structure and/or of the electrical coupling comprises: a physical construction, a capacitance, an impedance and/or a spatial position at the semiconductor component region 204.

Example 21 is the method 100 in accordance with example 20, furthermore comprising: wherein the impedance is a reactance or resistance.

Example 22 is the method 100 in accordance with any of examples 1 to 21, wherein determining the indication 1602 involves taking account of whether the semiconductor component region 204 comprises a plurality of segments which are arranged at a distance from one another and/or among one another are electrically conductively (e.g., resistively) coupled to one another.

Example 23 is the method 100 in accordance with any of examples 1 to 22, furthermore comprising: wherein classifying the semiconductor component region 204 involves taking account of whether the semiconductor component region 204 implements a logic circuit function.

Example 24 is the method 100 in accordance with any of examples 1 to 23, furthermore comprising: determining an additional indication 1606 (e.g., the inhomogeneity indication 1606) representing a relationship between the physical construction of the semiconductor component region 204 and a reference construction, wherein classifying the semiconductor component region 204 is furthermore carried out taking account of the additional indication 1606.

Example 25 is the method 100 in accordance with any of examples 1 to 24, furthermore comprising: determining a plurality of protective circuit structures, which are electrically coupled to the semiconductor component region 204, wherein a spatial distribution with which the plurality of protective circuit structures are coupled to the semiconductor component region 204 is taken into account when determining the additional indication 1606.

Example 26 is the method 100 in accordance with any of examples 1 to 25, wherein classifying the semiconductor component region 204 comprises determining whether the indication 1602 and/or the additional indication 1606 satisfy/satisfies a criterion.

Example 27 is the method 100 in accordance with any of examples 1 to 26, wherein the indication 1602 and/or the additional indication 1606 comprise(s) an (e.g., scalar) value, and wherein classifying the semiconductor component region 204 comprises determining whether the value exceeds a threshold value.

Example 28 is the method 100 in accordance with any of examples 1 to 27, furthermore comprising: determining an electrical coupling between the semiconductor layer 202 and the semiconductor component region 204, and determining a capability of the electrical coupling to counteract the electrical charging of the semiconductor component region 204 vis-à-vis the semiconductor layer 202, wherein classifying the semiconductor component region 204 is carried out taking account of the capability.

Example 29 is the method 100 in accordance with any of examples 1 to 28, wherein a network analysis of the circuit 400 is carried out for determining the indication 1602 and/or the additional indication 1604.

Example 30 is the method 100 in accordance with example 29, wherein at least one electrical property of the circuit 400 which represents an interaction of the electrical charging of the semiconductor component region 204 and an electric current flow brought about thereby to or from the semiconductor component region 204 is determined by means of the network analysis.

Example 31 is the method 100 in accordance with any of examples 1 to 30, wherein the circuit 400 is integrated into a semiconductor chip.

Example 32 is a nonvolatile computer-readable storage medium comprising code segments, wherein the code segments, when executed by a processor, carry out the method 100 in accordance with any of examples 1 to 31.

Example 33 is a device for the computer-aided characterization of a circuit 400, wherein the device comprises a processor configured to carry out the method 100 in accordance with any of examples 1 to 31.

What is claimed is:

1. A method for computer-aided characterization of a circuit comprising a semiconductor layer and a semiconductor component region embedded in the semiconductor layer in an electrically insulated manner, the method comprising:
obtaining a circuit model of the circuit;
using the circuit model, determining an indication representing an intensity of an electrical charging of the semiconductor component region by a production process used to produce the circuit with respect to the semiconductor layer, wherein a physical construction of the semiconductor component region is taken into account when determining the indication;
classifying the semiconductor component region taking account of the indication, including at least one electrical charging jeopardized classification in a first iteration of the method; and
adapting the circuit model to generate an adapted circuit model on the basis of a result of the classifying including the at least one electrical charging jeopardized classification.

2. The method as claimed in claim 1,
wherein a spatial surface area of the semiconductor component region is taken into account when determining the indication.

3. The method as claimed in claim 1,
wherein determining the indication comprises taking account of whether the semiconductor component region comprises a semiconductor junction.

4. The method as claimed in claim 1,
wherein the classifying comprises taking account of whether the semiconductor component region adjoins a dielectric layer structure to be protected.

5. The method as claimed in claim 1,
wherein the classifying comprises taking account of whether the semiconductor component region is electrically conductively coupled to an electrode structure, and
wherein the electrode structure and the semiconductor layer adjoin a dielectric layer structure to be protected, which is arranged at a distance from the semiconductor component region.

6. The method as claimed in claim 4,
wherein a physical construction of the dielectric layer structure to be protected is taken into account when determining the indication.

7. The method as claimed in claim 4, further comprising:
determining a property of the dielectric layer structure, wherein the property of the dielectric layer structure represents an electrical breakdown strength of the dielectric layer structure,
wherein classifying the semiconductor component region is furthermore carried out taking account of the property of the dielectric layer structure.

8. The method as claimed in claim 4,
wherein classifying the semiconductor component region comprises taking account of whether the dielectric layer structure is physically contacted by a discharge path that is electrically insulated from the semiconductor component region.

9. The method as claimed in claim 8, further comprising:
determining a property of the discharge path which represents an impedance of the discharge path,
wherein classifying the semiconductor component region is furthermore carried out taking account of the property of the discharge path.

10. The method as claimed in claim 4, further comprising:
determining a property of the circuit which represents an interaction between the intensity of the electrical charging of the semiconductor component region and an electric field strength brought about thereby in the dielectric layer structure,
wherein classifying the semiconductor component region is furthermore carried out taking account of the property of the circuit.

11. The method as claimed in any of claim 4, further comprising:
determining an interconnection of the dielectric layer structure in the circuit,
wherein classifying the semiconductor component region is furthermore carried out taking account of the interconnection of the dielectric layer structure.

12. The method as claimed in claim 4,
wherein classifying the semiconductor component region comprises taking account of whether the dielectric layer structure comprises a plurality of dielectric layers which are arranged at a distance from one another and are electrically coupled to one another.

13. The method as claimed in claim 12,
wherein classifying the semiconductor component region, for each layer of the dielectric layer structure, comprises taking account of whether the dielectric layer structure is part of a field effect component of the circuit.

14. The method as claimed in claim 1, further comprising:
determining an electrically conductive path along which the electrical charging by the production process is coupled in; and
determining a property of the electrically conductive path which represents an impedance of the electrically conductive path,
wherein classifying the semiconductor component region is furthermore carried out taking account of the property of the electrically conductive path.

15. The method as claimed in claim 1, further comprising:
determining a protective circuit structure, which is electrically coupled to the semiconductor component region,
wherein a property of the protective circuit structure and/or of the electrical coupling between the protective circuit structure and the semiconductor component region is taken into account when determining the indication.

16. The method as claimed in claim 15,
wherein the property of the protective circuit structure and/or of the electrical coupling comprises a physical construction, a capacitance, an impedance and/or a spatial position at the semiconductor component region.

17. The method as claimed in claim 1,
wherein determining the indication comprises taking account of whether the semiconductor component region comprises a plurality of segments which are arranged at a distance from one another and/or among one another are electrically conductively coupled to one another.

18. The method as claimed in claim 1,
wherein classifying the semiconductor component region comprises taking account of whether the semiconductor component region implements a logic circuit function.

19. The method as claimed in claim 1, further comprising:
determining an additional indication representing a relationship between the physical construction of the semiconductor component region and a reference construction,
wherein classifying the semiconductor component region is furthermore carried out taking account of the additional indication.

20. The method as claimed in claim 19, further comprising:
determining a plurality of protective circuit structures, which are electrically coupled to the semiconductor component region,
wherein a spatial distribution with which the plurality of protective circuit structures are coupled to the semiconductor component region is taken into account when determining the additional indication.

21. The method as claimed in claim 1, further comprising:
determining a coupling between the semiconductor layer and the semiconductor component region; and
determining a capability of the coupling to counteract the electrical charging of the semiconductor component region with respect to the semiconductor layer,
wherein classifying the semiconductor component region is carried out taking account of the capability.

22. The method as claimed in claim 1,
wherein a network analysis of the circuit is carried out when determining the indication.

23. The method as claimed in claim 22,
wherein at least one electrical property of the circuit which represents an interaction of the electrical charging of the semiconductor component region and an electric current flow brought about thereby to or from the semiconductor component region is determined by the network analysis.

24. A nonvolatile computer-readable storage medium comprising code segments, wherein the code segments, when executed by a processor, carry out the method as claimed in claim 1.

25. A device for computer-aided characterization of a circuit, wherein the device comprises a processor configured to carry out the method as claimed in claim 1.

26. The method as claimed in claim 1, further comprising performing a second iteration of the method using the adapted circuit model.

27. The method as claimed in claim 1, further comprising performing additional iterations of the method until no electrical charging jeopardized classifications are obtained.

28. The method as claimed in claim 1, wherein adapting the circuit model comprises adding an electrical connection and/or a protective circuit structure to the circuit model.

* * * * *